March 26, 1946.  J. J. KUNDIG  2,397,357
REACTION TURBINE PROPELLER
Filed March 9, 1942   14 Sheets-Sheet 1
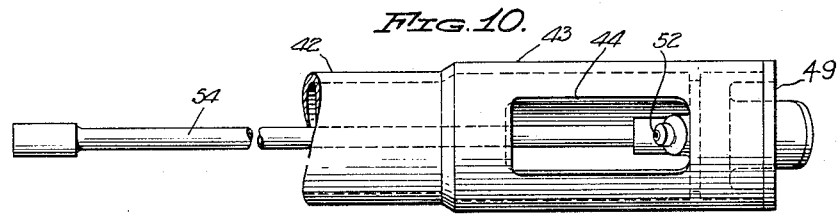
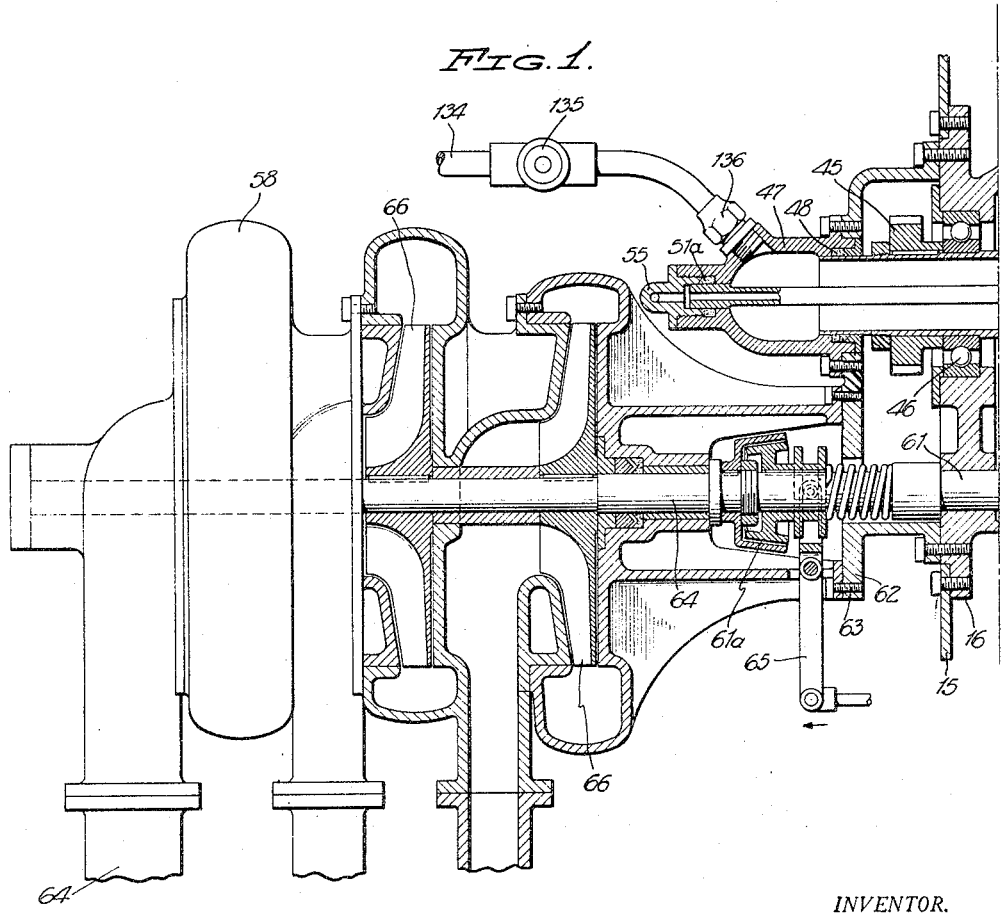
INVENTOR.
John J. Kundig
WITNESS:

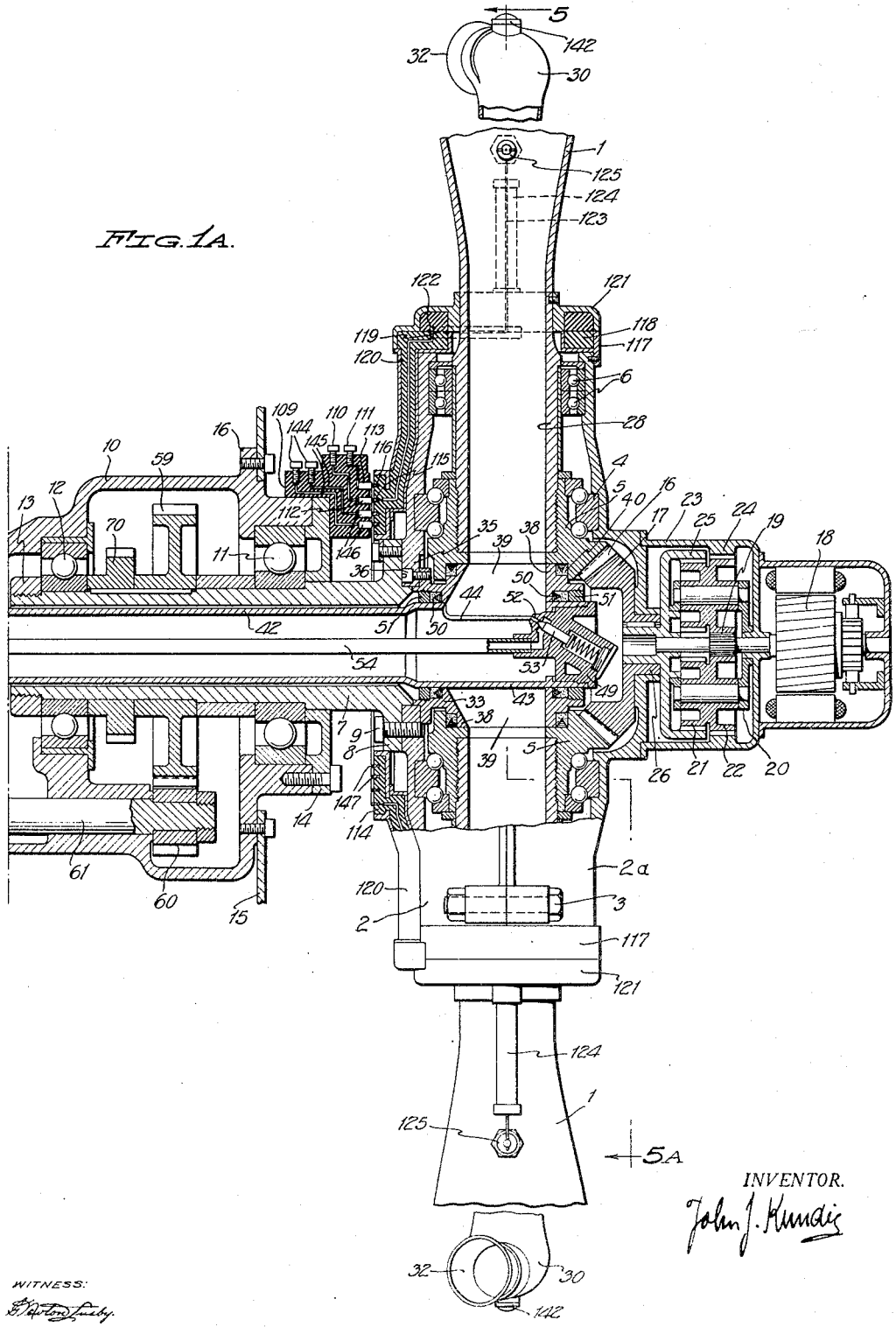

March 26, 1946. J. J. KUNDIG 2,397,357
REACTION TURBINE PROPELLER
Filed March 9, 1942 14 Sheets-Sheet 3

INVENTOR.
John J. Kundig

WITNESS:

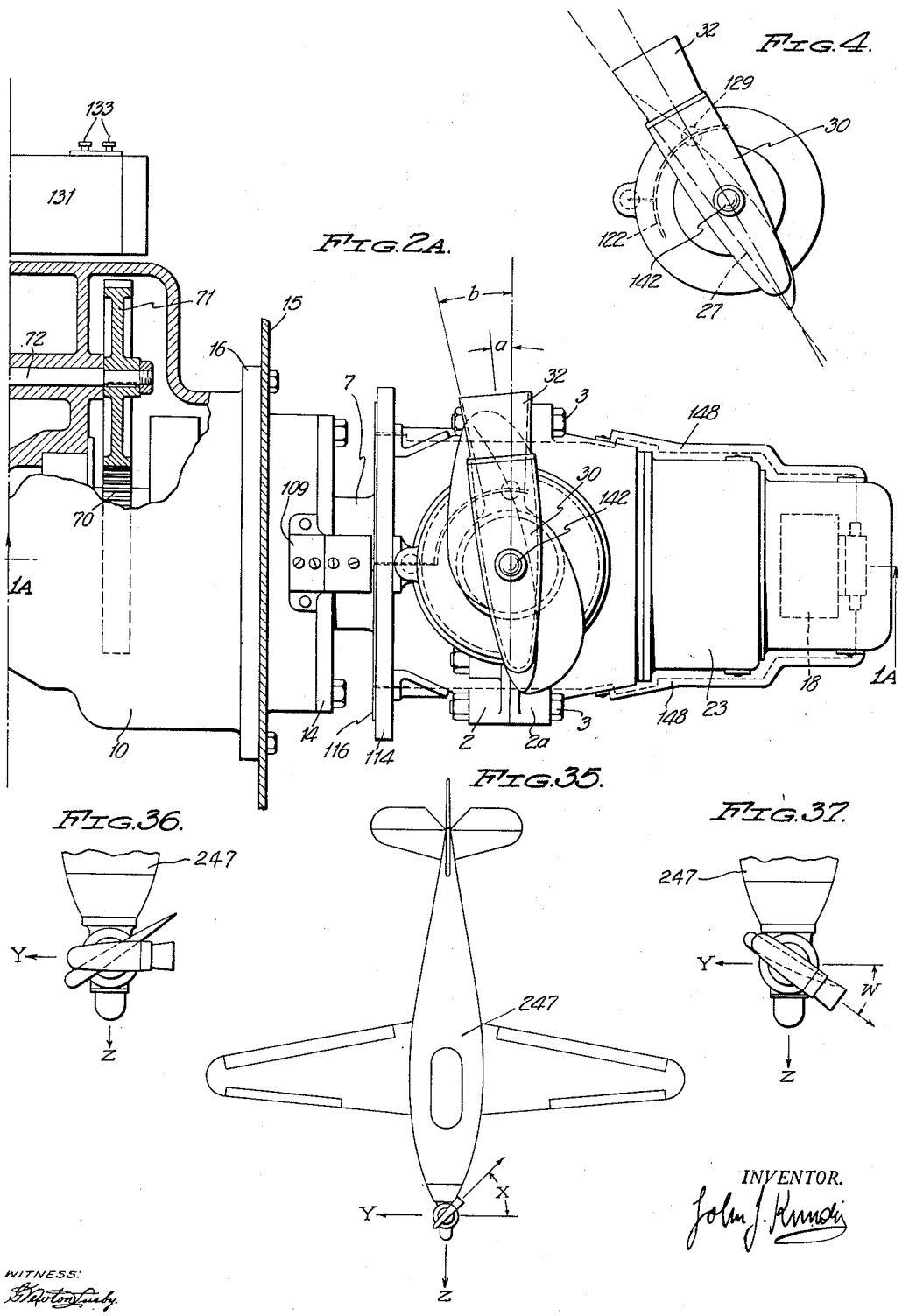

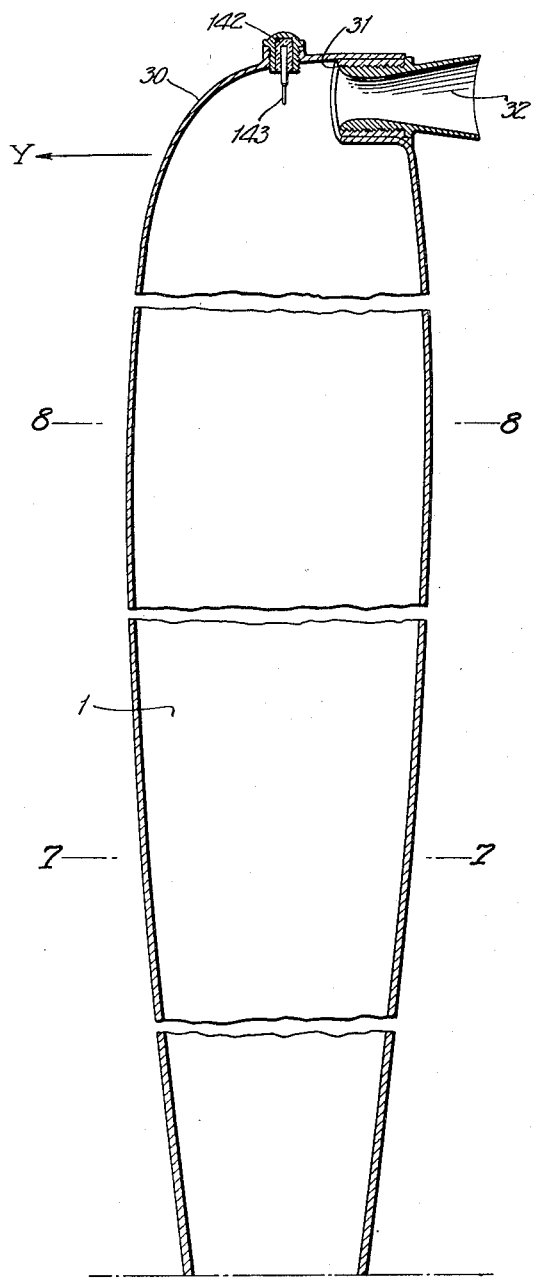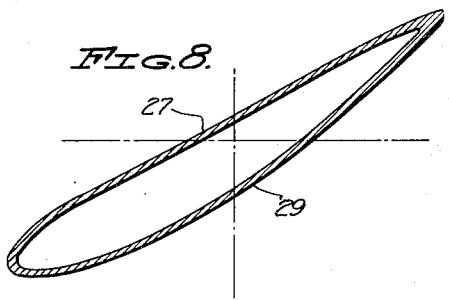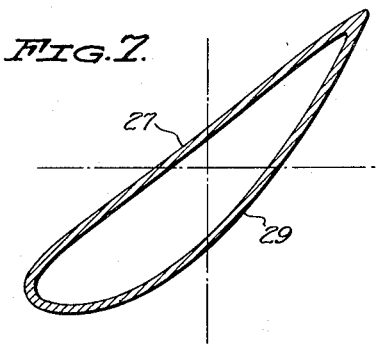

March 26, 1946.  J. J. KUNDIG  2,397,357
REACTION TURBINE PROPELLER
Filed March 9, 1942  14 Sheets-Sheet 6

INVENTOR.
John J. Kundig

WITNESS:

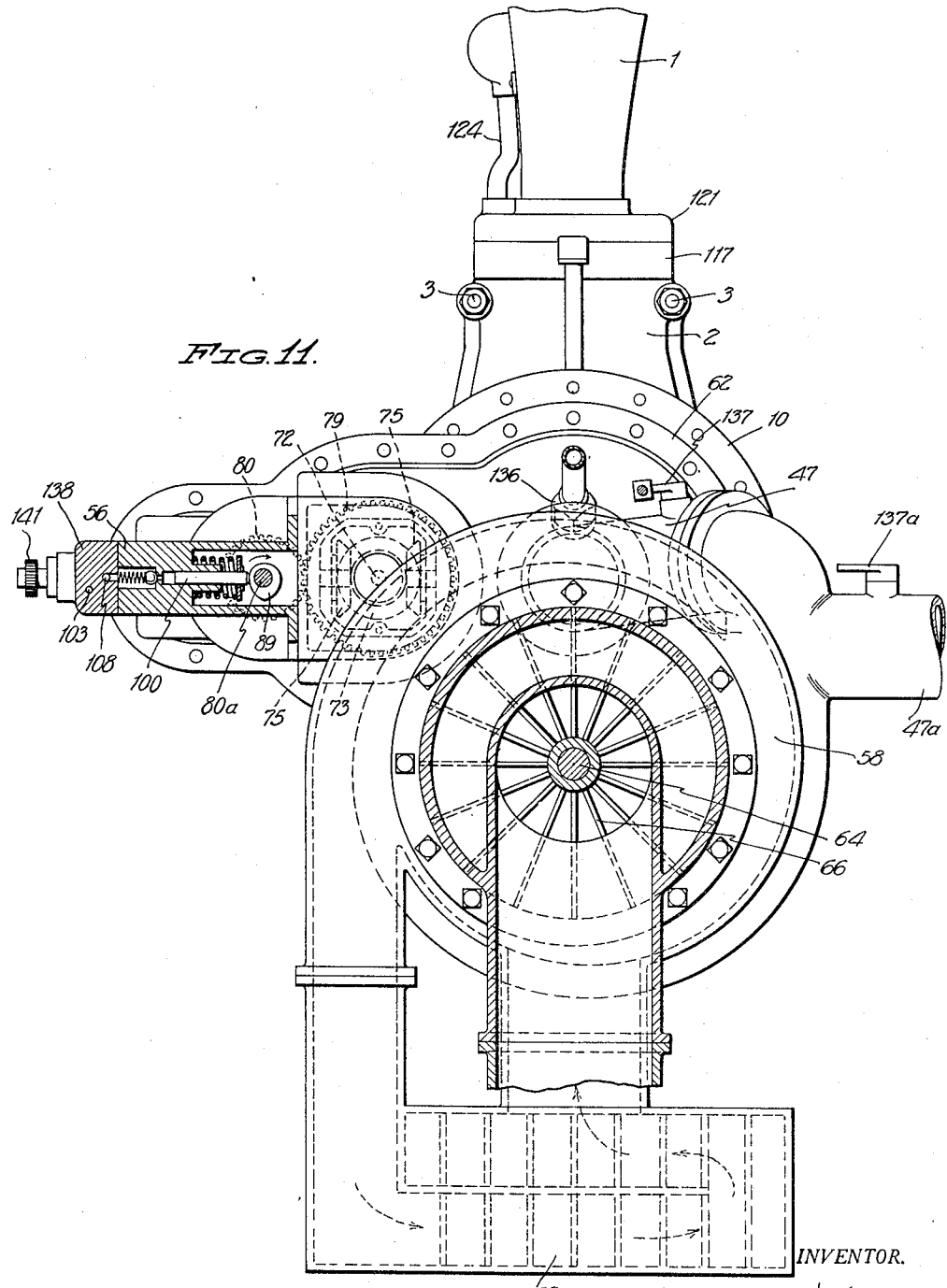

March 26, 1946.　　J. J. KUNDIG　　2,397,357
REACTION TURBINE PROPELLER
Filed March 9, 1942　　14 Sheets-Sheet 8

INVENTOR.
John J. Kundig

WITNESS:

March 26, 1946. J. J. KUNDIG 2,397,357
REACTION TURBINE PROPELLER
Filed March 9, 1942 14 Sheets-Sheet 9

INVENTOR.
John J. Kundig

WITNESS:

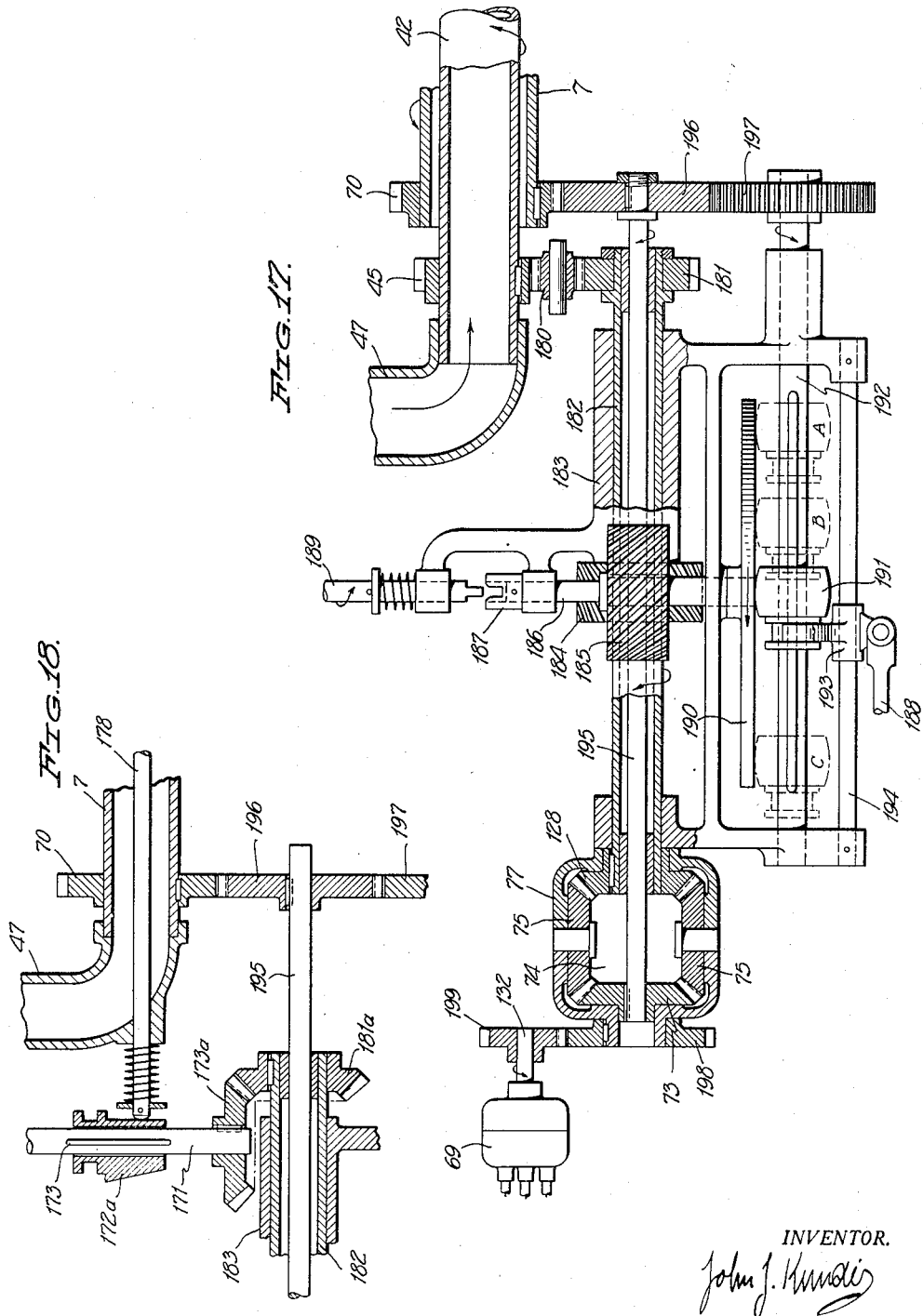

March 26, 1946.   J. J. KUNDIG   2,397,357
REACTION TURBINE PROPELLER
Filed March 9, 1942   14 Sheets-Sheet 11
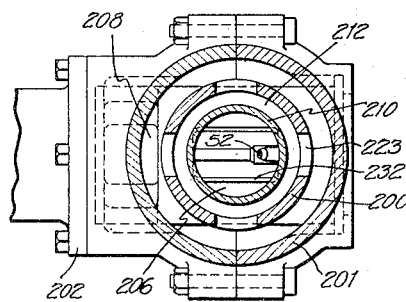
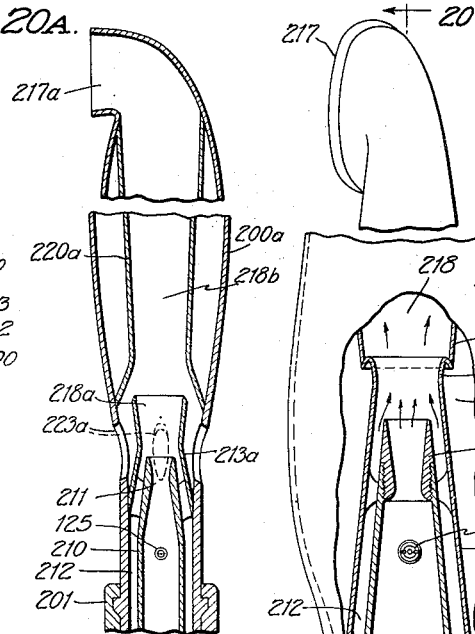
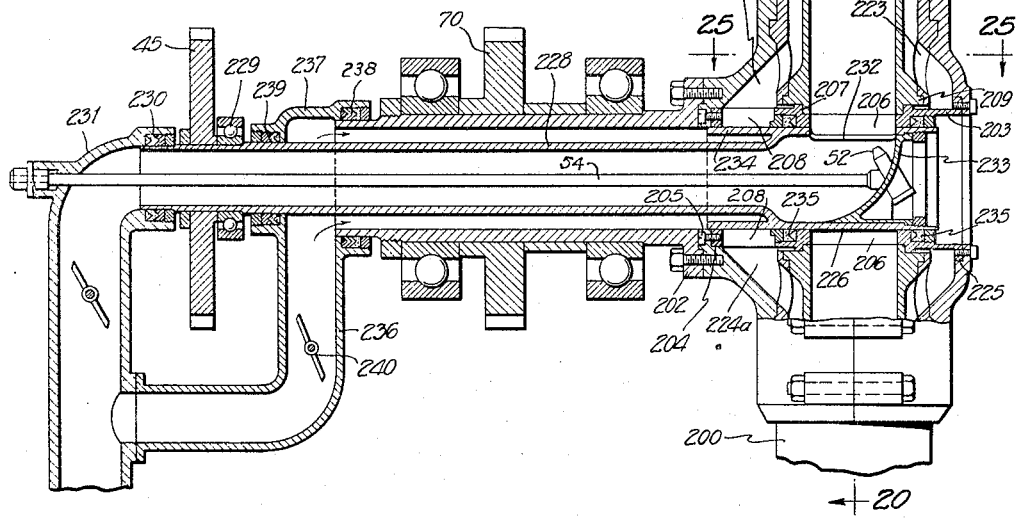
INVENTOR.
John J. Kundig

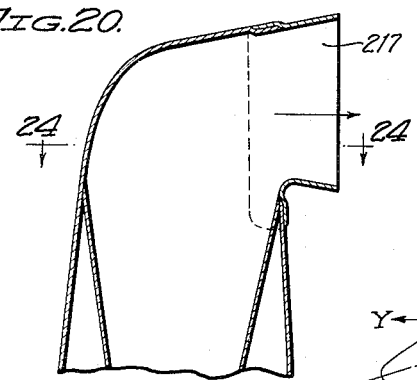
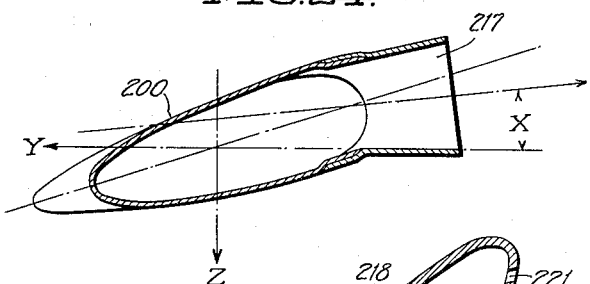
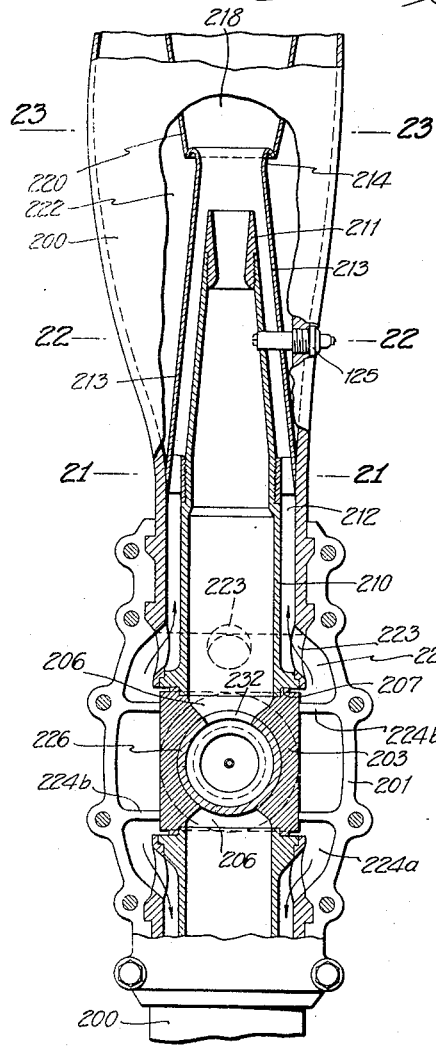

March 26, 1946. J. J. KUNDIG 2,397,357
REACTION TURBINE PROPELLER
Filed March 9, 1942 14 Sheets-Sheet 13

INVENTOR.
John J. Kundig

WITNESS:

INVENTOR.
John J. Kundig

Patented Mar. 26, 1946

2,397,357

UNITED STATES PATENT OFFICE 2,397,357

REACTION TURBINE PROPELLER

John J. Kundig, Hasbrouck Heights, N. J.

Application March 9, 1942, Serial No. 433,881

21 Claims. (Cl. 170—135.6)

The subject of this invention is a propulsion motor particularly adapted for propelling of aircraft.

The propulsion unit is composed of a free jet reaction gas turbine consisting of radially extending combustion chambers which are in the form of hollow propeller blades. The fuel or explosive charges are admitted through the hollow main shaft and controlled by a valve which is located in the propeller hub. After ignition of the charge, the gases are discharged to the atmosphere under high pressure and velocity through a divergent nozzle which is located at the extreme tip of the propeller blade or combustion chamber and in a general tangential direction in the plane of rotation of the propeller. The propeller or air screw is thereby rotated by the reaction or rocket effect of the gas blasts from the nozzles.

Since the greatest deficiency of the free jet reaction turbine, the principle of which I employ in my invention, is caused by the frictional loss of the rotating combustion chambers in the atmosphere, I convert all of this frictional loss into motive power by shaping the combustion chambers in the form of propeller blades for propelling the aircraft. The invention may therefore also be termed a self-propelling propeller or rocket propeller.

Rocket motors, in which general class my invention may be placed and which have heretofore been used experimentally for propelling aircraft, depend mostly on the reaction of the extremely high velocity exhaust gases for directly driving the aircraft in an opposite direction to the ejected gases. This method of propulsion has, however, proven to be most inefficient since the greatest part of the thermal energy of the fuel is lost in dissipated kinetic energy inherent in the gas blast which escapes under high pressure from the combustion chamber through a relatively small nozzle. This deficiency is due to the relatively slow speed of the aircraft in proportion to the high speed of the exhausting gas stream. Only a small portion of the available energy of the explosive charge can thereby be utilized for propelling the airplane.

While the reactionary force of the gas jet from the nozzle is proportional to the mass and to the velocity of exit of the gas, the kinetic energy is proportional to its mass and to the square of the velocity. Therefore, the reactionary force of such gas blasts is small as compared with its inherent kinetic energy.

In my present invention, wherein I locate the exhaust nozzles at the tips of the propeller blades which travel approximately at sonic speed, the efficiency of the rocket or reactionary effect is substantially increased. The reaction thrust of the exhaust blast is thereby applied at the circumference of the propeller, where the thrust required for rotation is relatively small as compared to the thrust required for directly propelling the aircraft by pure rocket reaction. The energy of the ejected gases is converted into mechanical power to rotate the propeller at high speed and thereby to propel the airplane in the conventional manner.

According to my invention, I may deviate the direction of the axis of the exhaust nozzle from the plane of rotation to thereby obtain varied thrust effects from the escaping gas blasts, for example, an aircraft flying at high altitudes can travel at greater speed as compared to low altitudes due to the decreased resistance in the low density atmosphere. The torque requirement for rotating the propeller is, therefore, also decreased while the retroactive force from the gas blasts remains constant. I may, therefore, apply only a part of the available force for rotating the propeller by directing the exhaust nozzle at an angle to the plane of rotation and thereby propel the aircraft partly by the action of the propeller and partly by a component force of the direct rocket effect of the gas blasts.

The propulsion turbine, consisting of radial combustion chambers and free jet reaction nozzles, as later described, constitutes a single expansion turbine wherein the ignited charges pass a single expansion stage to reach atmospheric pressure.

To increase the efficiency of conversion, my invention further contemplates a plurality of expansion nozzles with interposed converging nozzles which act as injectors to mix the expanding gases with additional air before the final discharge to the atmosphere. The mass of the gases is thereby increased while the speed of ultimate discharge is decreased with the result of an increased reactionary thrust.

The turbine propeller may, obviously be adapted to propel any other vehicle than aircraft, such as hydro-planes, vehicles on wheels or the like.

The above and other characteristics of the invention will be fully apparent in the following detailed description with reference to the accompanying drawings which, to make clearer, I have presented in semi-schematic form. Some details, which are not essential for the description, have been omitted since the invention, as disclosed, will be clearly understood by those skilled in the art.

Figs. 1 and 1A are vertical longitudinal sectional views, partly in elevation of the turbine taken substantially along the lines 1—1 and 1A—1A of Figs. 2 and 2A respectively.

Figs. 2 and 2A are top plan views of the turbine with parts of same in section.

Fig. 3 is an enlarged vertical sectional view taken substantially along the line 3—3 of Fig. 2.

Fig. 4 is an end elevational view of the propeller, showing the nozzle in a modified position to that shown in Fig. 2A.

Figure 5A:
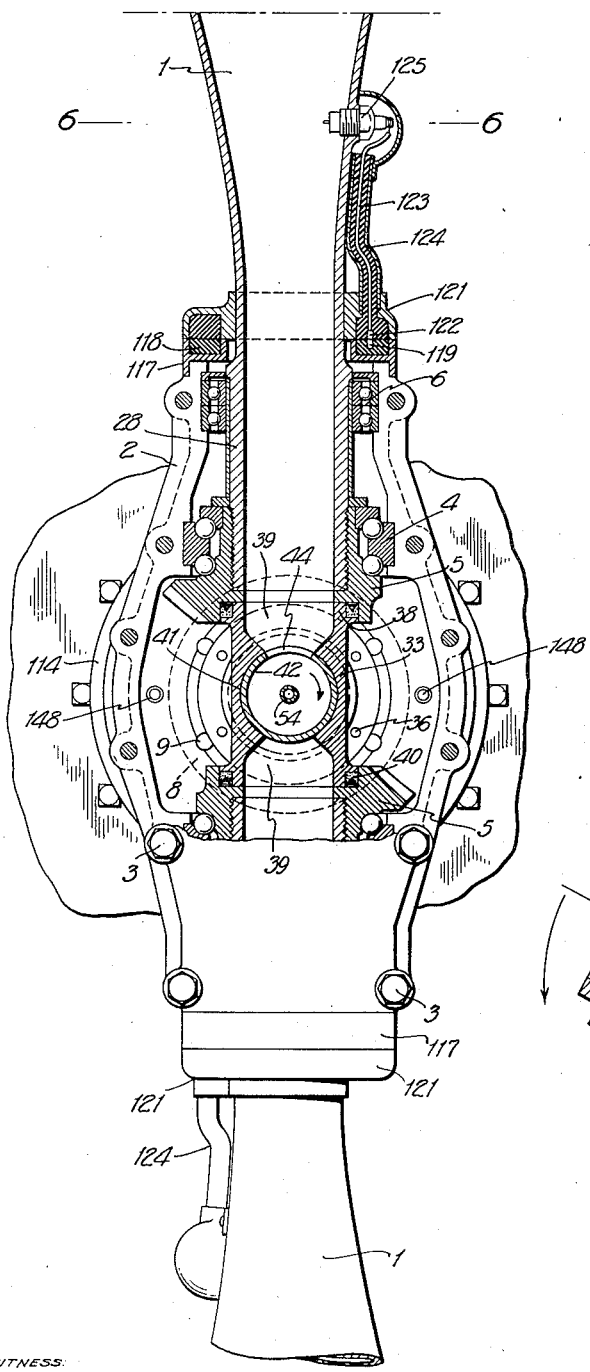

Figs. 5 and 5A combined are a vertical sectional view substantially on the line 5—5A of Fig. 1A, with certain parts in front elevation.

Figure 6:
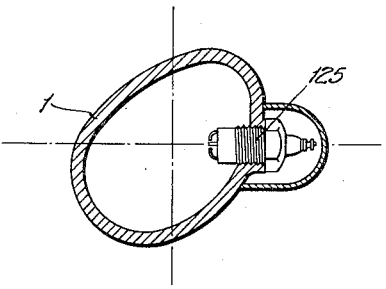

Fig. 6 is an enlarged transverse sectional view taken substantially on the line 6—6 of Fig. 5A.

Fig. 7 is an enlarged transverse sectional view taken substantially on the line 7—7 of Fig. 5.

Fig. 8 is an enlarged transverse sectional view taken substantially on the line 8—8 of Fig. 5.

Figure 9:
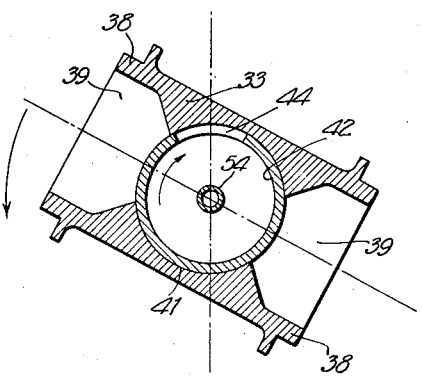

Fig. 9 is an enlarged sectional view of the valve as shown in Fig. 5A, illustrating the parts in a closed position.

Fig. 10 is an enlarged elevational view of a portion of the valve illustrated in Figs. 1A, 5A and 9.

Figures 2, 3:
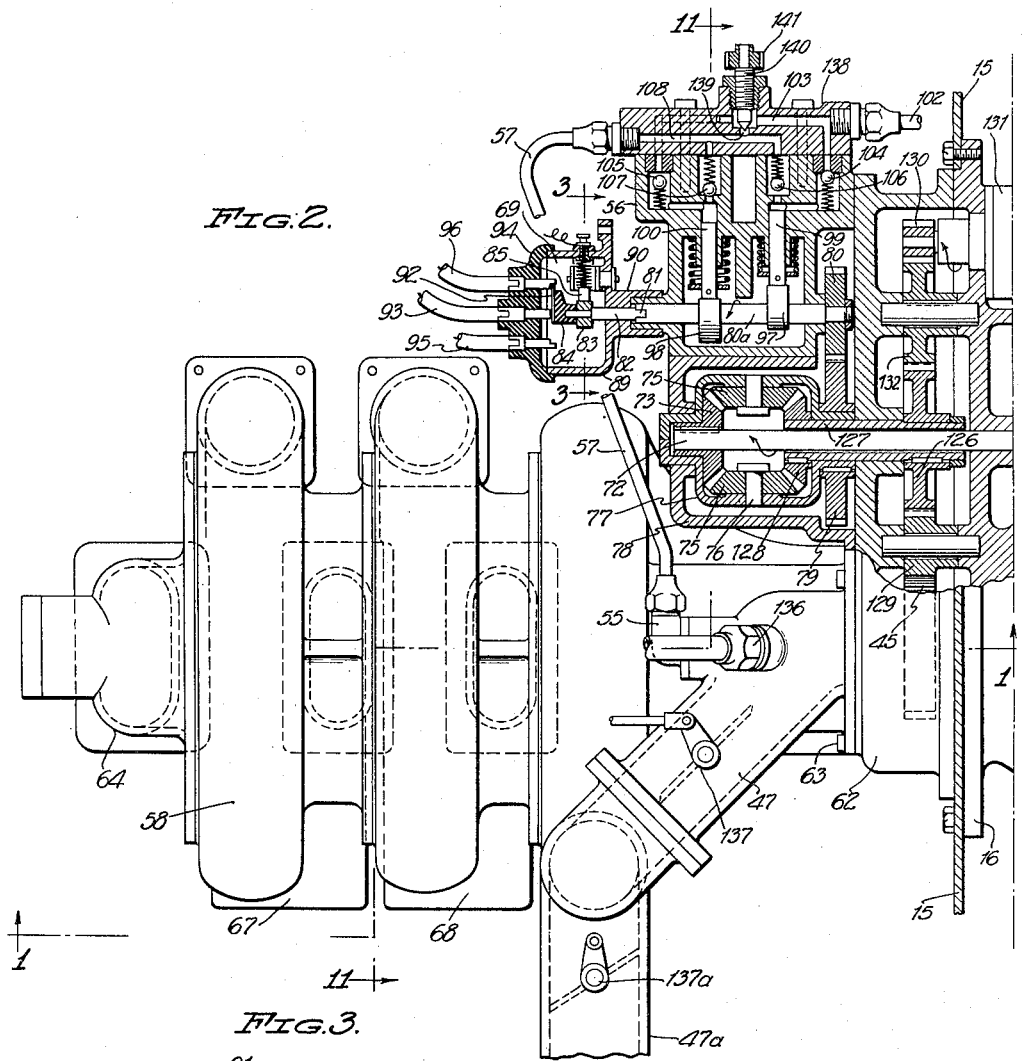

Fig. 11 is a vertical sectional view taken substantially on the line 11—11 of Fig. 2.

Figure 12:
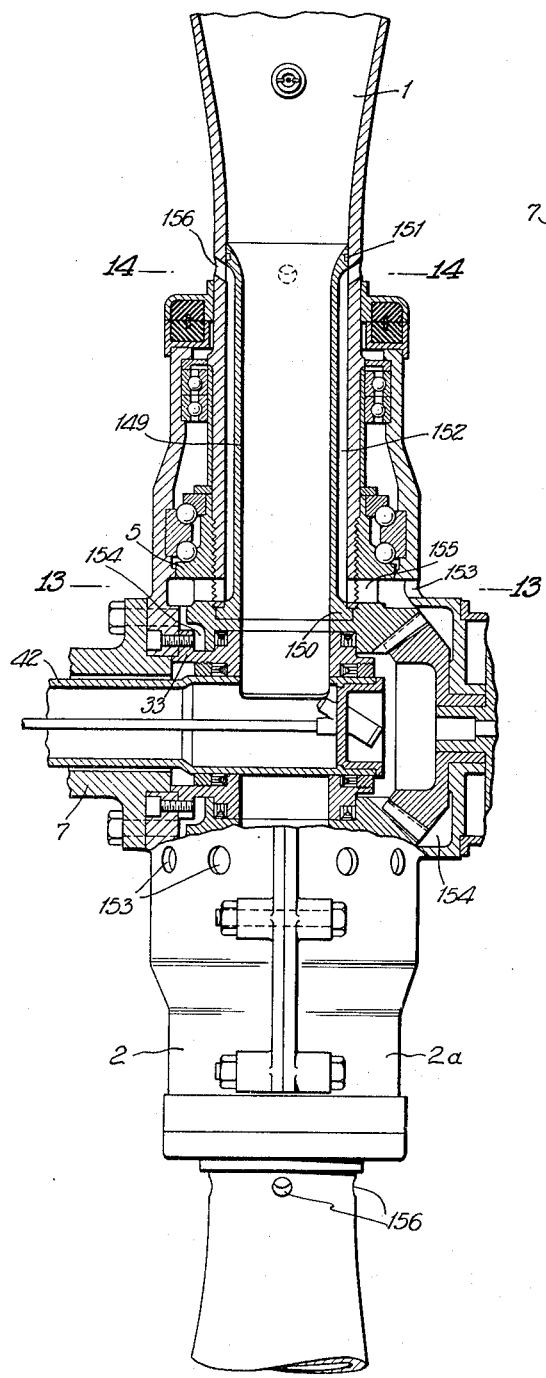

Fig. 12 is a vertical sectional view, partly in elevation, of a slightly modified form of the invention.

Figure 13:
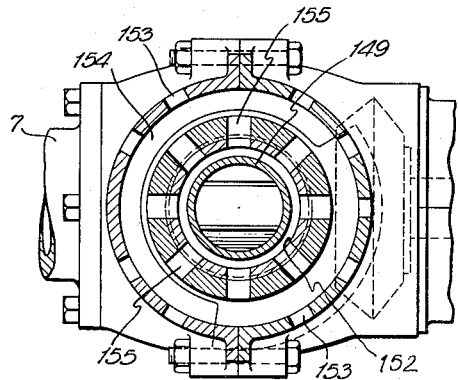

Fig. 13 is a transverse sectional view taken substantially on the line 13—13 of Fig. 12.

Figure 14:
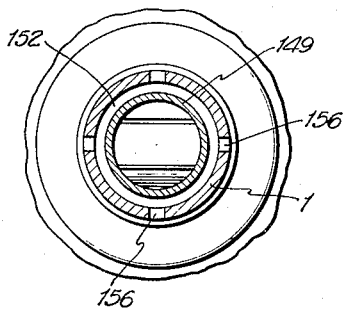

Fig. 14 is a transverse sectional view taken substantially on the line 14—14 of Fig. 12.

Figure 15:
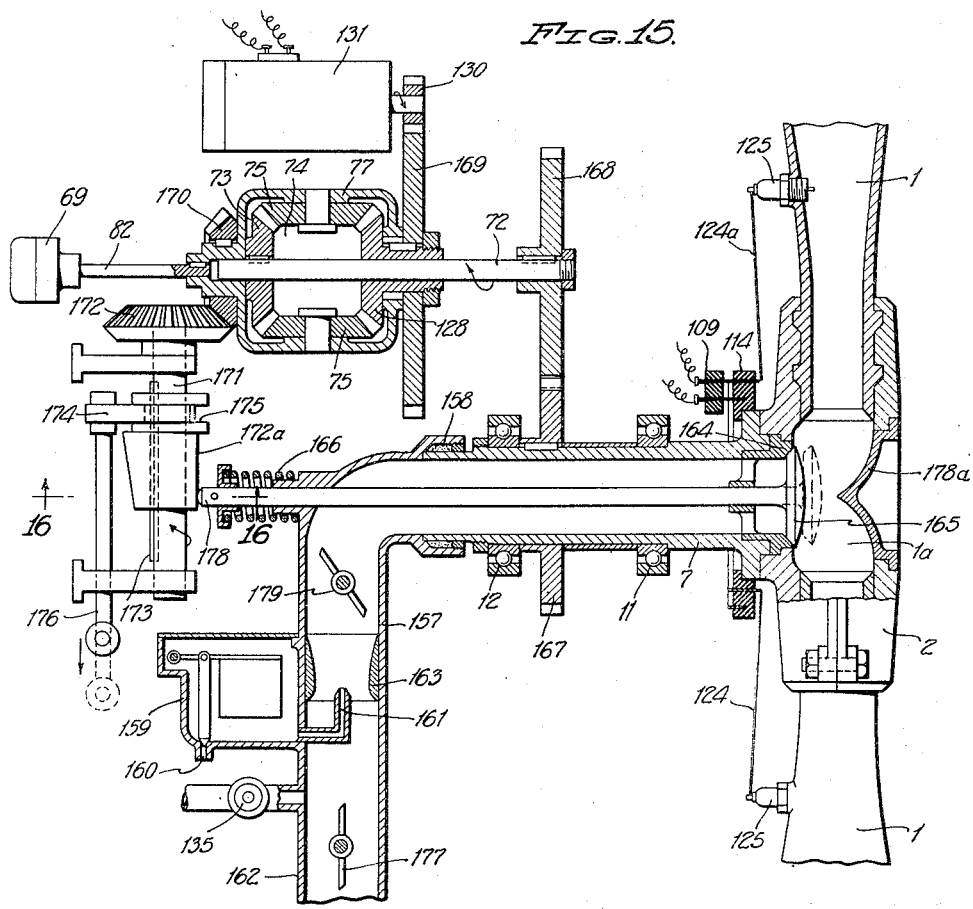

Fig. 15 is a fragmentary longitudinal horizontal sectional view of another modified form of control means.

Figure 16:
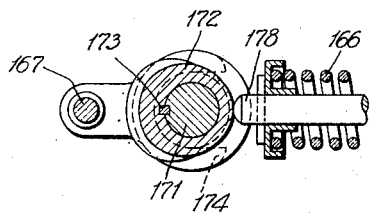

Fig. 16 is an enlarged transverse sectional view taken substantially on the line 16—16 of Fig. 15.

Fig. 17 is a longitudinal horizontal sectional view of further modified forms of control means.

Fig. 18 is a fragmentary longitudinal sectional view illustrating a further modified control means for the valve shown in Fig. 15.

Fig. 19 is a vertical longitudinal sectional view, partly in elevation and broken away, illustrating a further modification of the turbine and combustion chamber.

Fig. 20 is a vertical transverse sectional view, partly in elevation and broken away, taken substantially on the line 20—20 of Fig. 19.

Fig. 20A is a partial transverse sectional view, partly broken away, of a further modification of the turbine.

Figs. 21, 22, 23 and 24 are enlarged transverse sectional views taken substantially on their respective lines 21—21, 22—22, 23—23, and 24—24 of Fig. 20.

Fig. 25 is a transverse sectional view taken substantially on the line 25—25 of Fig. 19.

Figure 26:
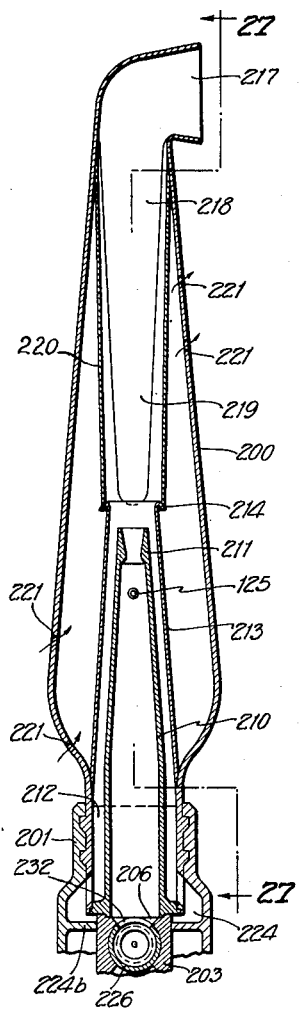

Fig. 26 is a fragmentary vertical sectional view of the turbine illustrated in Fig. 19.

Figure 27:
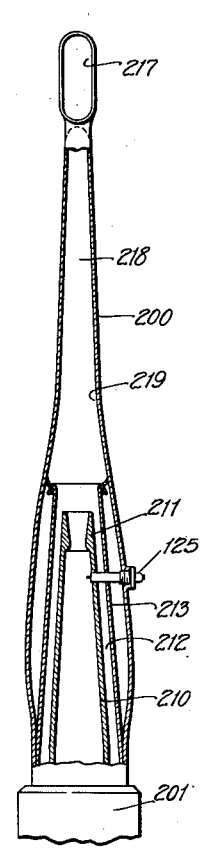

Fig. 27 is a transverse vertical sectional view, partly in elevation, taken substantially on the line 27—27 of Fig. 26.

Figure 28:
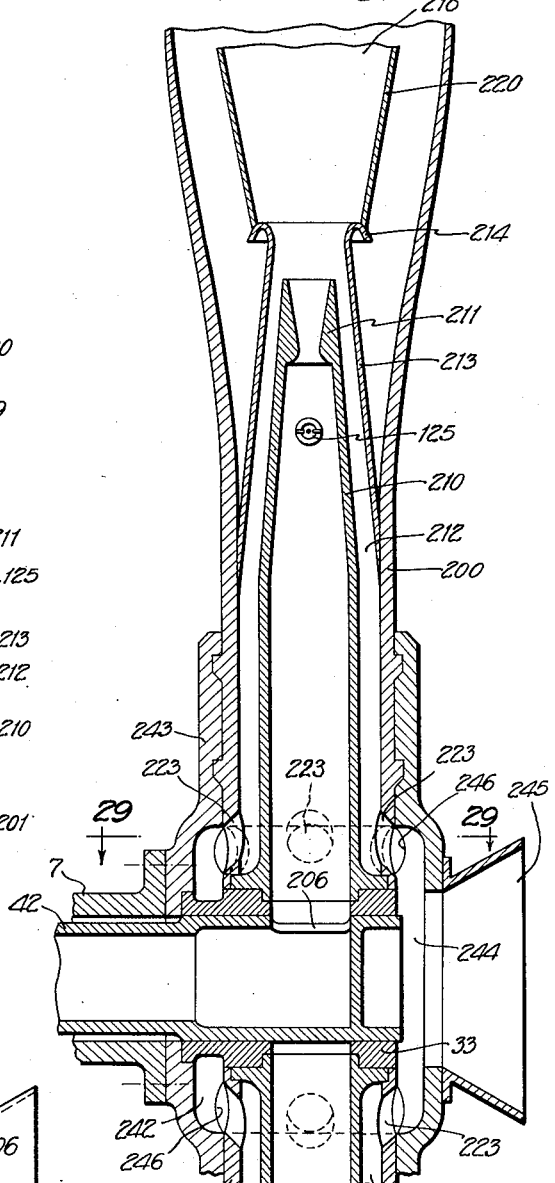

Fig. 28 is an enlarged vertical sectional view of a further modified form of combustion chamber.

Figure 29:
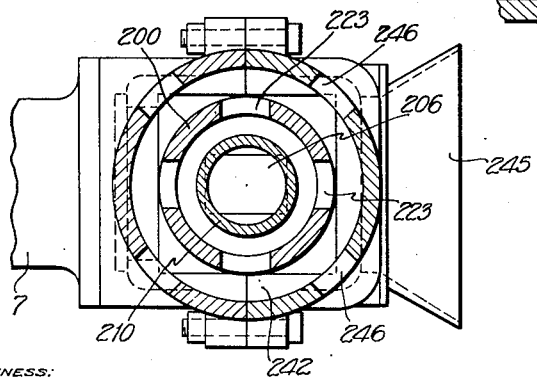

Fig. 29 is a horizontal sectional view taken substantially on the line 29—29 of Fig. 28.

Figure 30:
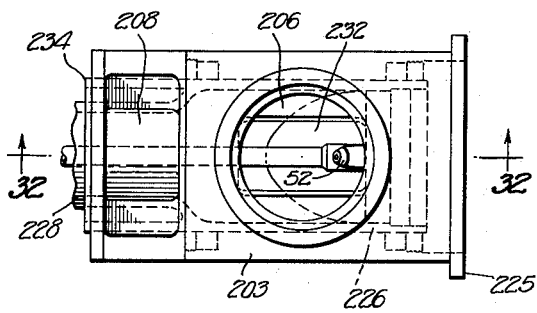

Fig. 30 is a fragmentary view, in elevation, illustrating the valve portion shown in Figs. 19, 20, and 26.

Figure 31:
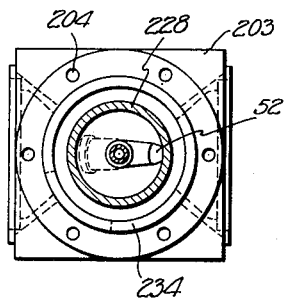

Fig. 31 is an end elevation of the valve shown in Fig. 30.

Figure 32:
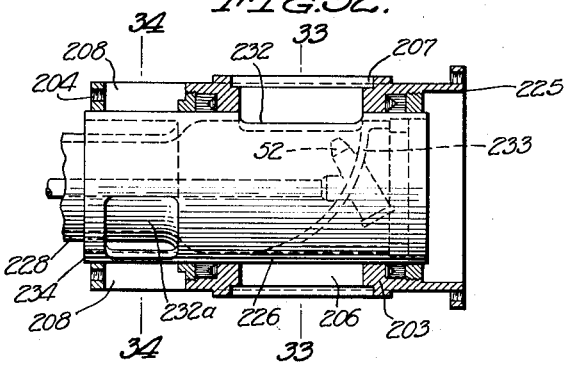

Fig. 32 is a longitudinal sectional view, with parts in elevation, taken substantially on the line 32—32 of Fig. 30.

Figure 33:
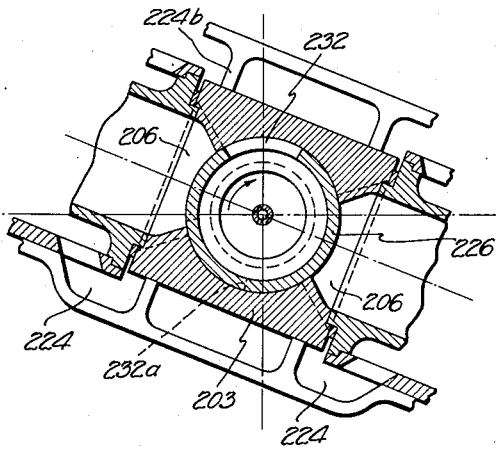

Fig. 33 is a vertical transverse sectional view taken substantially on the line 33—33 of Fig. 32 with a portion of the housing illustrated.

Figure 34:
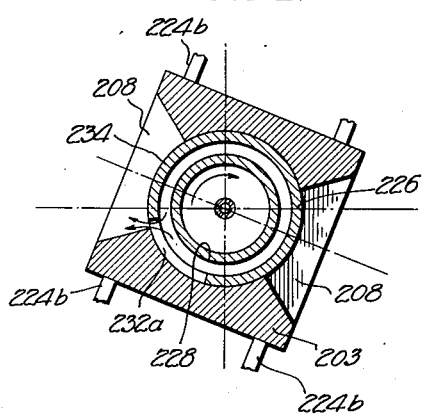

Fig. 34 is a vertical transverse sectional view taken substantially on the line 34—34 of Fig. 32.

Fig. 35 is a top plan view of the turbine as mounted on an airplane.

Figs. 36 and 37 are fragmentary top plan views of the propeller blade and nozzle in varied positions.

Referring now to the different drawings, in which like parts as designated by like reference characters, Figs. 1 to 11 inclusive, illustrate one embodiment of the invention and which I designate as a single expansion turbine propeller. A pair of combustion chambers, which are made in the form of hollow propeller blades 1, extend radially from a central hub. The hub is formed of the two half portions 2 and 2a which are clamped together by the screws 3. The propeller blades or combustion chambers are held against radial thrust by the thrust ball bearing 4 of which the inner race 5 is threaded to the inner end of the blade 1. The ball bearings 6 guide the blades in radial alignment.

The hub and blade assembly is carried by a rotatable and hollow main shaft 7 and secured to the flanged portion 8 thereof as by the screws 9. The shaft 7 extends rearwardly through a housing 10 and is carried therein by the ball bearings 11 and 12. The nut 13 and the front cover 14 absorb the axial thrust of the shaft 7. The turbine or propeller assembly may be secured to an aircraft or other vehicle, which it is propelling, as by the plates 15 which are bolted to the flanged portions 16 of the housing 10.

The inner ball race 5 is made integral with the bevel gear sector 16 which is in mesh with the bevel gear 17 located in the front portion of the hub 2a. By rotating the bevel gear 17, the propeller blades 1 are rotated around their radial axes whereby the screw pitch angle may be varied as required. Rotation of the bevel gear 17 is effected by a pitch varying mechanism which is secured to the front portion of the hub 2a. While there are several different types of such mechanisms in present-day use, for illustration purposes only, I have shown an electrically actuated compound epicyclic gear reduction mechanism.

A reversible electric motor 18 carries on its armature shaft a small sun pinion 19 meshing with the planetary gears 22. Each of the gears 22 are made integral with the adjacent gears 21 which are of slightly smaller diameter and rotatably mounted on the spider frame 20. A gear housing 23, which is fastened to the front of the hub 2a, comprises an internal gear 24 which is in mesh with the planetary gears 22. The cup-shaped internal gear 25, of smaller diameter than the internal gear 24, meshes with the planetary gears 22 and is keyed to the hub 26 of the bevel gear 17. The combination of gears, as described, forms a high ratio reduction drive whereby the propeller blades may be adjusted to any angular position within the range of the gear sector 16 by rotating the small but high-speed electric motor 18 in either direction.

The turbine element of my invention is shown as consisting of two opposite combustion chambers 1. The volumetric capacity of the combustion chambers, which must be correctly proportioned with the force requirements for rotating the propeller at the required speed, is effected by properly forming the blades to the streamlined shapes as shown in Figs. 5 to 8 inclusive, wherein the pressure or working side 27 of the blade is made in a generally flat form as for aerodynamic reasons.

The general shape of the blade resembles a tubing which is cylindrical at the shank portion 28 surrounded by the propeller hub 2—2a and gradually flattened out towards the other end. In order to obtain the required volume, the cross-sections through the combustion chambers will appear in the general shapes as shown in the Figs. 6, 7 and 8. The camber side 29 of the blade is in the form of a slight bulge which gradually reduces towards the end where the form of the blade emerges with the streamlined tip or extreme end 30 of the propeller. The blades are made from high tensile metal and may be produced by either of the several methods as employed for manufacturing hollow propeller blades.

At the tip 30, I provide a threaded opening 31 with an exhaust nozzle 32 screwed therein and pointing in a general tangent direction and approximately parallel to the pressure side 27 at the outer end of the blade.

In the central portion of the propeller hub and between the inner ends of the combustion chambers 1, I provide a valve housing 33 having a cylindrical axial bore 41 and which is fastened to the inner face 35 of the hub 2 by means of the screws 36. The oppositely located cylindrical extensions 38 of the valve housing 33 with the apertures 39 extend radially into the inner ball race 5 of the combustion chamber 1. The packing rings 40 form an effective seal against the gas pressure inside the combustion chambers.

The seal rings 40 may be made of a flexible and heat resistant material composed of asbestos and graphite or equivalent.

A tubular valve member 42 has a rotatably fitted sealing surface 43 extending into the cylindrical bore 41 of the valve housing 33 and is provided with a valve port 44 as shown in the plane view of Fig. 10. The front end of the valve 42 is closed by the threaded head 49. The valve is axially sealed against leakage by the seal rings 50 which are disposed in the cylindrical counterbores of the valve housing 33 and retained by the threaded rings 51.

A diametrically reduced portion of the valve 42 extends rearwardly through the hollow mainshaft 7 and carries a gear 45 which is keyed thereon adjacent to the ball bearing 46 supporting the valve in the housing 10. The left end of the valve 42 extends into the stationary intake pipe 47 and is sealed therein by the packing gland 48.

Assuming that I use a volatile fuel, such as gasoline, as a source of motive power for the turbine, I may employ the fuel injector methods for producing the explosive charges for the combustion chambers. For this purpose, I provide a fuel injector nozzle 52 which is disposed in the valve head 49 and points in a direction through the valve port 44. A spring pressed needle valve 53 normally closes the fuel passage from the fuel pipe 54 as shown in Fig. 1. The injector nozzle 52 may obviously be located at any other suitable position in the valve 42 or intake pipe 47.

The fuel pipe 54 which is fixed to the valve head 49 extends centrally and rearwardly through the valve 42 and into the fuel supply fitting 55 which is screwed into the intake pipe 47. The stuffing gland 51a prevents leakage of the fuel. A fuel pump 56, which will be described later, supplies the fuel under high pressure to the fitting 55 and spray nozzle 52 through the pipe 57.

In order to increase the thermal efficiency and thereby multiply the power output of the turbine, I may use precompressed air for mixing with the fuel injected by the nozzle 52 to thereby effect a high density charge in the combustion chambers. For this purpose, I may use a multistage turbocompressor or supercharger 58 which is rotated at high speed by the main shaft 7 of the turbine through the driving gear 59, driven pinion 60 and drive shaft 61. A spring-pressed friction clutch 61a connects the drive shaft 61 to the compressor shaft 64 and may be disengaged by operating the forked clutch lever 65 in the direction of the arrow. The clutch 61a, which I have shown as an exemplary element only, will, in practical use, be of a more suitable type, such as a fluid coupling, for effectively transmitting the required power.

Obviously, I may use any other suitable type of compressor driven by the turbine, or I may employ an independently driven compressor unit for supplying the air to the turbine.

The compressor as shown is composed of three pressure stages and fastened to the rear cover 62 of the housing 10 as by the screws 63. The air, which is admitted through the intake duct 64, passes successively through the first, second and third stage to be finally discharged to the intake pipe 47 and therefrom to the valve 42 and combustion chambers 1 of the turbine. The compression is effected by the centrifugal force transmitter by the rotating impellers 66 to the air and increased during the progressive passage through the succeeding stages.

In order to increase the volumetric efficiency of the turbocompressor, I may interpose the intercoolers 67 and 68 between the first and second and between the second and third stage respectively, as indicated in the Figs. 2 and 11. The air, passing through the intercoolers, which are in the general form of cellular radiators, in the direction of the arrows as indicated in Fig. 11, is cooled therein by radiation from a stream of cold air or liquid.

The fuel pump 56 together with the ignition timer is driven in the following manner. Adjacent to the supercharger drive gear 59, I provide a gear 70 keyed to the main shaft 7 and engaging the driven gear 71 which is located on the front end of the countershaft 72. The gears 70 and 71 are of equal ratio. The opposite end of the shaft 72 carries the differential bevel gear 73 of a differential drive unit and which engages the planetary gears 75 carried on the pins 76 of the spider housing 77. The latter is rotatably mounted in the housing 78 and provided with a gear 79 on its right-hand hub extension to engage the gear 80 on the camshaft 80a of the two-cylinder fuel pump 56. Since the gear 79 will rotate only half as fast as the differential bevel gear 73, due to the differential effect, the gear 79 is two times the diameter of the gear 80 to effect rotation of the camshaft 80a at the same speed as the main shaft 7.

The left end of the cam shaft 80a is provided with a transverse slot 81 engaging the ignition timer spindle 82 to thereby rotate the timer cam 83 and distributor 84. A spring pressed contact arm 85 is pivotably mounted on the pin 86 for operation by the rotating cam 83 to thereby make or break contact between the contact points 87 and 88. The insulated pivot pin 86 is mounted in the timer housing 89 which is rotatably disposed on the fuel pump by the hub extension 90. By means of the control rod 91, the timer housing 89 may be pivoted around its axis to vary the angular relation between the contact arm 85 and the cam 83.

The insulated distributor 84 carries a contact plate 92 which is constantly in contact with the central terminal 93 of the insulated distributor head 94 and arranged to alternately contact the terminals 95 and 96 during rotation of the spindle 82 and concurrently with the breaking of contact between the points 87 and 88 by the action of the cam 83 upon the contact arm 85.

The camshaft 80a of the fuel pump 56 comprises two cams 97 and 98 which are angularly offset 180° relative to each other. By the action of the cams upon the spring pressed plungers 99 and 100 which are slidably disposed in the bores of the pump cylinders, the fuel is drawn from the intake line 102 to the intake canal 103 and through the suction valve 104 or 105. During the discharge stroke of the plungers, the fuel is pressed through the discharge valve 106 or 107 to the outlet canal 108 and, hence, through the pipes 57 and 54 to the injection or spray nozzle 52. The spring pressed needle valve 53 will be lifted by the pressure influence of the fuel whereby the spray nozzle is opened only during the discharge periods of the fuel pump 56. If the sum of the angular width of the valve port 44 and the therewith registering aperture 39 are equal to the angle of rise of the cams 97 or 98, the fuel will obviously be injected into the combustion chamber during the full opening period of the valve port 44.

If the tubular valve 42 is stationary and the valve housing 33, together with the combustion chambers 1 and the shaft 7, is rotated in a counterclockwise direction, the fuel pump 56 will alternately deliver a charge of fuel to each combustion chamber during the passage of the latter by the valve port 44.

The action of the ignition timer 69 is synchronized in a similar manner. The double contact cam 83, rotating in unison with the fuel pump shaft 80a and therefore at the same speed as the main shaft 7, effects two interruptions of contact between the points 87 and 88 during each revolution of the combustion chambers, respectively turbine. The contact points 87 and 88 are connected in series with a source of electric current and with the primary circuit of an induction coil, which I do not deem necessary to illustrate and describe further, since it is well understood by those skilled in the art. The secondary or high tension circuit of the induction coil is connected with the central terminal 93 of the distributor head 94 and, through the contact plate 92 of the rotating distributor 84, contacts alternately the terminals 95 and 96.

An insulated terminal block 109, which is fixed at the front end of the housing 10, is provided with the terminals 110 and 111 which are connected with the terminals 95 and 96 and with the contact brushes 112 and 113 respectively. A ring-shaped insulator 114, which is screwed to the flanged portion 8 of the main shaft 7 to rotate in unison therewith, carries the concentric contact rings 115 and 116 which are wiped by the brushes 112 and 113 respectively.

Each of the radial extremities of the hub 2—2a is provided with a circular casing 117, which is fixed thereon and comprises an insulating core 118. A metallic sector 119 is imbedded in the core 118 and connected to one of the contact rings 115 or 116 as by an insulated conductor 120. In close relation to the casing 117 and fixed around the shank of the combustion chamber 1, I provide the casing 121 which comprises a metallic sector 122 imbedded in an insulating core and wiping the oppositely located sector 119. A conductor 123 which is imbedded in the radially extending insulated tubing 124 makes connection between the sector 122 and the spark plug 125 which is screwed into the combustion chamber 1 and preferably at a substantial distance away from the valve 42. Since the angular length of the sector 119 and 122 is equal to the angular movement of the combustion chamber around the radial axis, contact between said sectors will always be maintained with the result that I have established a continuous line of contact between the distributor 84 and one of the spark plugs 125.

The terminal block 109 is further provided with the terminals 144 which are connected to the brushes 146 and thereby to the inner pair of contact rings 147. A pair of insulated conductors 148 connect the contact rings 147 with the electric motor 18. By connecting the terminals 144 to a source of electric current, the motor may be actuated to thereby effect the required pitch angle adjustment of the combustion chambers 1 and nozzles 32.

To start the turbine propeller, it would be necessary to provide a powerful starting motor, such as used to start the conventional internal combustion engines, for rotating the turbine at considerable speed in order to effect induction of explosive charges into the combustion chambers.

According to my invention, I may also employ the following means for starting the turbine. A gear 126 is keyed to a tubular shaft 127 which surrounds the countershaft 72. On its left end, the tubular shaft 127 is keyed to the differential bevel gear 128 which meshes with the planetary gears 75 in opposite relation to the bevel gear 73. The gear 126 is operatively connected to the valve gear 45 by means of the intermediate pinion 129 and also engages the drive gear 130 of the reversible electric motor 131 through the intermediate pinion 132. The terminals 133 of the electric motor are to be connected to a source of electric current by a reversing switch and rheostat.

If the motor 131 is caused to rotate in the direction of the arrow, or in a clockwise direction as seen from the right or front end, the tubular valve 42 will also be rotated in a clockwise direction as indicated by the arrows in Figs. 5A and 9. As the turbine and main shaft 7 are stationary, the left-hand differential bevel gear 73, which is in driving engagement therewith, is also stationary, while the right-hand differential bevel gear 128 is rotated by the motor 131 in a clockwise direction together with the planetary gears 75 and spider housing 77, whereby the fuel pump shaft 80a together with the timer shaft 82 is rotated in a direction as indicated by the arrows in the Figs. 2, 3 and 11.

The fuel pump 56 will thereby operate in the same manner as previously described, namely, when actuated by the left-hand differential gear 73, respectively by the main shaft 7 and intermittently inject fuel charges through the nozzle 52 into the combustion chambers 1 during the passage of the valve port 44 by the apertures 39.

In order to provide the necessary combustible mixture for the initial starting impulses, I may employ compressed air from a storage tank or other source and which is admitted to the valve 42 from the line 134 and through the m....ual control valve 135 and connection 136 which is located on the intake pipe 47. By closing the butterfly valve 137 in the intake pipe 47, the compressed air will be prevented from escaping into the compressor 58 which, at the same time, is uncoupled from the drive shaft 61 by disengaging the clutch 61a.

Assuming now that fuel is supplied to the pipe 102, the air valve 135 is opened and the intake control valve 42 is rotated in a clockwise direction by the motor 131, the combustion chambers 1 will be alternately charged with an explosive mixture of air and gasoline under high pressure. When the aperture 39 of one of the combustion chambers 1 is closed by the rotating valve 42 and in the relative position of the valve and valve housing as shown in Fig. 9, the timer cam 83, being then in a position as shown in Fig. 3, has opened contact between the points 87 and 88, whereby an electric spark is effected at the spark plug 125 to thereby ignite the charge in the combustion chamber. The resultant rise of temperature of the ignited gases will effect a big increase of pressure, whereby the burnt gases will escape at high velocity and expand during the passage through the divergent nozzle 32. The impulse from the reactionary thrust of the mass of the escaping gases upon the extreme end of the combustion chamber starts to rotate the turbine in the direction of the arrow Y or opposite to the direction of the gas blast from the nozzle 32.

Concurrently with the combustion and exhaust period of one combustion chamber, the opposite chamber receives its charge from the rotating valve port 44 and the above described process of combustion and exhaust is repeated.

The succeeding explosions in the combustion chambers will now rapidly accelerate the speed of rotation of the turbine, thereby also accelerating the speed of rotation of the fuel pump shaft 80a by the addition of the turbine speed to the relative speed of the rotating valve 42, as effected by the differential planetary gears 75. The timing of the fuel pump and ignition system is thereby maintained in perfect synchronism with the opening periods of the intake valve 42.

I may now stop the rotation of the valve 42 by stopping the motor 131. The openings of the valve 42, respectively the admission of the charges may now be controlled by the valve housing 33 rotating around the stationary valve 42.

When the turbine has gained sufficient momentum, the supply of compressed air is shut off by closing the valve 135. By subsequently opening the butterfly valve 137 and engaging the friction clutch 61a to actuate the compressor 58 by the turbine shaft 7, the compressed air for the explosive charges will be supplied by the compressor 58.

It must, however, be understood that the compressor or supercharger is not an essential element of the turbine, but a means to improve its efficiency. The rotating combustion chambers 1 must be considered a single stage compressor by themselves due to the tremendous centrifugal force which acts upon the fuel charge inside of the chambers.

I may, therefore, also run the turbine without the compressor by opening the atmospheric valve 137a. The vacuum in the tubular valve 42 and created by the rotating chambers 1 draws the air in from the atmosphere. By the centrifugal force, the charge is then slung or projected towards the outer portions of the chamber and thereby compressed prior to ignition. Obviously, by using the turbocompressor for supplying the air, the rotating combustion chambers must be considered as an additional compressor stage.

It will be seen that there are now two explosions, respectively one explosion in each of the combustion chambers, during one revolution, when the intake valve 42 is maintained stationary, whereby the turbine may rotate at a normal speed, which corresponds to, say, the cruising speed of the aircraft which it is propelling by the action of the propeller-shaped combustion chambers.

I may reduce the speed of rotation of the turbine by increasing the time intervals between intake valve openings. This is accomplished by rotating the motor 31 in a counterclockwise or opposite direction as during the starting period of the turbine. The valve 42 will then rotate counterclockwise or in the same direction as the turbine with the result that the number of intake valve opening periods, respectively charges to the combustion chambers, for a given number of rotations, will be reduced, resulting in a reduction of the speed of the turbine.

Obviously, the fuel pump and ignition timer will be maintained in synchronism with the intake valve operation periods, since the reversed rotation of the motor driven differential bevel gear 128 causes the planetary gears 75 together with the spider housing 77 to rotate at a speed which is equal to the differential between the speeds of the bevel gears 128 and 73 and corresponding exactly to the speed differential between the valve housing 33 and the valve 42.

To increase the speed and thereby the power output of the turbine to a maximum, the motor 131 is rotated in a clockwise direction to thereby rotate the valve 42 in an opposite direction relative to the rotation of the turbine, whereby the frequency of explosions will be increased.

It must, of course, be understood, that, while the relative speed difference between the valve 42 and the rotating valve housing 33 is varied, as above described, the time period of actual registry between the valve port 44 and the combustion chambers is also varied. The pressure of the entering charges must, therefore, be adjusted accordingly in order to assure a correctly proportioned air and fuel mixture as well as the correct amount for completely charging the combustion chambers. This is accomplished by appropriately regulating the air supply valve 137 and the spill valve 141.

It will be noted that, normally, the amount of fuel as injected by the nozzle 52 for each charge is equal to the volumetric displacement of the plunger in the fuel pump 56. Since, however, the volumetric capacity of the fuel pump is made in excess to the normal requirement, for practical reasons, the delivery of the pump is made adjustable. The cylinder head 138, which is bolted to the fuel pump body and embodies the outlet and intake canals 108 and 103 respectively, is provided with a passage 139 between the intake and outlet canals. The passage 139 is adjustable by the threaded needle valve 140 which may be manually regulated as by the pinion 141 thereon.

During the pressure strokes of the pump, some of the fuel in the outlet canal 108 will be spilled through the restricted passage 139 into the intake canal 103, thereby reducing the amount of fuel injected by the nozzle 52. By appropriately regulating the compressor air butterfly valve 137 and the fuel pump spill valve 140, I may effect any desirable volume and/or mixture control of the combustible charges for the turbine.

In order to effect ignition at the proper time for most efficient combustion of the gases in the combustion chambers 1, the moment of breaking contact between the points 87 and 88 may be predetermined by adjusting the angular position of the ignition timer 89 by the manual control rod 91. The moment of ignition by the spark plug 125 may thereby be retarded or advanced as required by the mixture characteristic of the charges and by the speed of the turbine.

It will be understood that the combustible gas mixture entering during the charging period through the valve port 44 into the combustion chamber is traveling therein at a very high speed in a radial direction, which is due to the inherent precompression and to the centrifugal force. The passage area of the valve port 44 must be correctly proportioned in relation to the time period of opening, magnitude of precompression of the gas, speed of the turbine and volume of the combustion chamber in order to insure complete filling of the chamber by the charge.

Immediately after closure of the valve 42, and during a position of the latter as shown in Fig. 9, a portion of the charge located near the tip 30 may escape through the nozzle 32 without being ignited, due to the inherent inertia of the gases, since the rate of propagation of flame, which starts at the spark plug 125 during the concurrent ignition of the charge, may be too slow to reach the outermost portions of the chamber at the proper time. Since it may not be practical to locate the spark plug 125 at the tip of the propeller blade on account of the great additional centrifugal stresses, in order to assure complete ignition of the charge, I provide a glow plug 142 at or near the extremity of the chamber 1. The heat of the exploding gases during the starting period of the turbine will cause the metallic ignition element 143 of the glow plug 142 to glow at red hot temperature, which will be maintained between explosion periods. The charge will then be ignited at the correct time, when it reaches the vicinity of the nozzle 32 and complete ignition is effected by the resulting propagation of flame in a radial direction towards the axis of the turbine and in opposition to the gas flow in the chamber. The electric ignition system may then be shut off.

As I have stated before, the period of opening of the intake valve 42 and the therewith synchronized period of cam rise, respectively pressure stroke, of the fuel pump 56, may be of equal duration, whereby a full charge of combustible mixture of air and fuel is admitted to the combustion chamber. By correctly proportioning the volume of the chamber, the passage area of the exhaust nozzle 32 and the speed of the turbine in relation to each other, the pressure of the precompressed charge, when entering the combustion chamber, must be slightly higher than the pressure of the gases which remain in the root portion of the chamber at the end of the previous combustion period. The entering gases will then act as a ram or fluid piston to force the remaining burned gases out through the nozzle 32. Contact between the fresh charge and the residual gases may, however, result in preignition of the charge and thereby cause backfiring through the still open intake valve 42. To avert this condition, I may make the angle of rise of the fuel pump cams 97 and 98 smaller than the angle of the intake valve opening and thereby retard the fuel injection period in relation to the opening of the valve port 44. A small amount of scavenging air is thereby forced through the intake valve 42 into the chamber and ahead of the combustible charge to thereby isolate the latter from contact with the hot gases and thereby prevent preignition.

The exploding gases have, obviously, a maximum temperature in the vicinity of the nozzle 32 where the pressure is highest. The propeller blades will, however, be adequately cooled, to prevent detrimental effects thereto, by radiation during rotation of the turbine. In the shank portions of the chambers in or near the hub 2—2a, the temperature of the gases is lower during combustion due to the relatively lower pressure and to the cooling effect of the fresh charges entering through the intake valve 42. Should the temperature, however, be detrimental to the functioning of the ball bearings 4 and 6 and other working parts located in or near the hub of the turbine, I may provide a separate cooling system for the shank or hub portion of the propeller. As indicated in Figs. 12, 13 and 14 of the drawings which show the hub portion, with some modifications thereof, of the turbine illustrated in Fig. 1A, I have provided a cylindrical sleeve 149 inside the combustion chamber 1 and which is sealed and fixed to the inner end thereof as by the flanged portion 150. The other end of the sleeve 149 is sealed with the inside of the chamber 1 as by the flared portion 151, thereby forming a hollow elongated space 152 between the sleeve and the inner wall of the combustion chamber 1. The hub 2—2a is provided with a plurality of spaced radial holes 153, which provide communication between the hollow space 154 of the hub surrounding the valve housing 33 and the ball race 5 and the atmosphere. Another series of radial holes 155 passing through the threaded portion of the ball race 5 and combustion chamber 1, form communication between the hollow space 154 and the space 152 around the sleeve 149. At the opposite end of the sleeve 149, I provide a plurality of radial holes 156 passing through the wall of the combustion chamber and connecting the space 152 with the atmosphere.

During rotation, a powerful suction is created in the hollow space 154 by the centrifugal effect in the space 152, thereby effecting a continuous stream of air to pass through the holes 153, spaces 154 and 152 and holes 151. In other words, the hollow space 152 acts as a centrifugal blower for effectively cooling the surrounding parts by a continuous stream of fresh air.

To control the admission of the charges to the combustion chamber 1, I may, obviously, employ any suitable type of valve other than the described rotating sleeve valve 42. In the diagrammatic Figs. 15 and 16, I have shown an exemplary application of a poppet valve and the actuating means therefor in conjunction with a single combustion chamber turbine. In this embodiment of the invention, I have shown the propeller blades 1 as fixed in the hub 2 and, for reasons of simplicity, have omitted the pitch varying mechanism which, obviously, can also be incorporated in this construction.

The compound combustion chamber 1a extends from one propeller tip across the hub 2 to the opposite propeller tip. The hub 2 is fastened centrally to the hollow and flanged main shaft 7 which is rotatable in the ball bearings 11 and 12. In order to effect a more rapid propagation of flame during the ignition of the charge, I provide a spark plug 125 for each of the combustion chambers and substantially spaced from each other. Each of the spark plugs is connected to a separate circuit as by the conductors 124 and 124a, which connect by the contact ring 114 with the terminals 109, which are connected to a double ignition system as commonly used with internal combustion engines. The ignition is controlled by the ignition timer 69 in a similar way as previously described.

The left end of the hollow main shaft 7 is connected to the stationary intake pipe 157 and carburetor 159 as by a stuffing box 158. The fuel for the motive power of the turbine enters the carburetor from the supply pipe 160 and is metered and vaporized by the jet 161 to be mixed in the venturi 163 with air which is supplied from the pipe 162, thereby forming explosive charges for the combustion chamber 1a. The right end of the main shaft 7 is provided with a valve seat 164 for the poppet valve 165 which is normally held in closed position by the valve spring 166.

A gear 167, fixed in the main shaft 7, engages the driven gear 168 on the differential shaft 72 which carries on its left end the bevel gear 73 meshing with the planetary gears 75 of the differential drive 74. The right-hand differential bevel gear 128 carries on its hub extension the gear 169 which engages the drive pinion 130 of the reversible electric motor 131. The spider housing 77, which carries the planetary gears 75 and is adapted to rotate around the bevel gears 73 and 128, has a bevel gear 170 keyed on its left hand hub, which is in driving engagement with the ignition timer shaft 82. At a right angle to the axis of the differential 74, a cam shaft 171 carries the mitre gear 172 which meshes with the bevel gear 170. A tapered cam 172a for operating the poppet valve 165 is engaged with the cam shaft 171 by the key 173 and adapted to be shifted axially thereon as by the fork 174 which engages the groove 175 of the cam 172a. The fork 174 may be manually operated as by the shaft 176.

To start this turbine, I may also employ compressed air which, after closing the butterfly valve 177, is admitted by opening the air valve 135. Simultaneously, the electric motor 131 is started to rotate in the direction of the arrow or counterclockwise as seen from the right side, thereby rotating the differential spider housing 77 in a clockwise direction by the bevel gear 128 which meshes with the planetary gears 75. The ensuing rotation of the cam shaft 171 will effect opening of the intake valve 165 which is pushed towards the right by the high portion of the cam 172a acting upon the valve stem 178. The explosive charge entering through the open valve 165 is equally divided by the baffle 178a and immediately after the valve 165 is closed by continued rotation of the cam 172a.

The resulting gas blast through the exhaust nozzles (not shown in this figure) will effect rotation of the propeller in a counterclockwise direction and similarly as explained in the description of Fig. 1A of the drawings. If the motor 131 is now stopped, the cam 172a will be continuously driven by the main shaft 7 through the medium of the gears 167 and 168 and the differential drive 74, thereby successively opening and closing the intake valve 165 and effecting intermittent charging and combustion periods to accelerate the speed of the turbine. Upon closing of the air valve 135, the butterfly valve 177 is opened to admit air from the pipe 162. The pressure and the volume of the mixture, passing from the carburetor 159 to the turbine, may be regulated by the butterfly valve 179.

The carburetor 159 is, of course, only an exemplary means for providing combustible mixtures for the turbine and may be substituted by a fuel injector system as described.

To increase the volume of the explosive charges, I may increase the opening stroke of the valve 165, respectively the passage area through the open valve during the intake periods. This is accomplished by manually operating the shaft 176 in the direction of the arrow, whereby the tapered cam 172a is shifted on the cam shaft 171 with the result that the higher portion of the cam rise operates the valve stem 178, thereby effecting a longer opening stroke of the valve 165. The frequency of valve openings, respectively explosions, may be controlled in the same manner as previously described—namely, by rotating the motor 131 in directions equal or opposite to the direction of rotation of the propeller, whereby the speed of rotation of the cam 172a and, consequently, the frequency of valve openings may be increased or decreased.

In Fig. 17, I have shown a modification of the valve operating means, whereby the mechanism for controlling the frequency of intake valve openings is driven directly by the turbine, thereby obviating the motor 131. For this purpose, I employ a reversible and variable speed drive mechanism which is shown as an exemplary embodiment in the form of a friction drive mechanism. It must be understood that I may employ any other suitable variable speed gear for the purpose as will be described.

The character 42 indicates the tubular intake valve which is surrounded by the hollow main shaft 7 of the turbine. The air or explosive charges are admitted through the intake pipe 47. The valve gear 45 on the left end of the valve 42 is engaged with the gear 181 by the intermediate pinion 180. A tubular shaft 182 which carries the gear 181 on its right end, is supported in the bearing bracket 183 and keyed on its left end to the bevel gear 128 of the differential drive 74. A spiral gear 184 is also keyed to the tubular shaft 182 and engages the superimposed spiral gear 185 which is keyed to the transversely positioned shaft 186. The upper end of the latter is provided with a slotted part 187 which is adapted to be engaged by the starting spindle 189. The lower end of the shaft 186 carries a friction disk 190 adapted to frictionally engage the friction pulley 191 which is slidably mounted on the splined shaft 192. By means of the fork 193 which is slidable on the guide rod 194 and manually operable as by the rod 188, the pulley 191 may be shifted transversely in front of the friction disc 190.

A shaft 195, coaxial with the tubular shaft 182, carries on its right end the gear 196 which meshes with the turbine shaft gear 70 and the gear 197 on the friction pulley shaft 192. The left end of the shaft 195 which extends through the differential drive 74, is keyed to the differential bevel gear 73. The spider housing 77 of the differential drive together with the planetary gears 75 are adapted to rotate around the bevel gears 73 and 128 and connected to rotate the timer spindle 132 of the ignition timer 69 by means of the gears 198 and 199.

For starting the turbine, the starting shaft 189 is engaged with the slotted part 187 of the shaft 186 and rotated in the direction of the arrow. This may be accomplished manually or by means of a motor. The tubular valve 42 and the timer spindle 132 will thereby be rotated in the directions as shown by the arrows with the result that an explosive charge will be admitted to the combustion chamber, and which, after subsequent ignition of the charge, will start the rotation of the turbine and main shaft 7 in the direction of the arrow.

After disengaging the starting shaft 189 from the shaft 186, the valve will be stationary and the intake of the charges will be controlled by the valve housing rotating around the valve 42 as described before. The ignition timer is now actuated by the shaft 195 which is rotated by the main shaft 7.

To accelerate the frequency of explosions, respectively valve openings, the friction pulley 191 is shifted by the operating rod 188 from the neutral or inoperative position as shown towards the right to a position as indicated in dotted lines and by the indexing letter A. The rotating pulley 191, in the assumed position and driven by the gear 197, causes the friction disc 190 to rotate in the direction of the arrow and thereby rotating the tubular shaft 182 by the spiral gears 185 and 184.

The tubular valve 42, rotating now in an opposite direction relative to the rotation of the turbine, will thereby accelerate the successions of valve openings, whereby the power of the turbine is increased. The rotating speed of the ignition timer 69 will, of course, be maintained in perfect synchronism with the frequency of valve openings by the effect of the differential drive 74, as previously described.

By shifting the friction pulley 191 into a position as indicated in dotted lines and by the indexing letter B or towards the axis of the friction disc 190, the speed of the latter will, obviously, be increased with the result that the frequency of valve openings, and thereby the power of the turbine, will be increased to a maximum.

By shifting the friction pulley 191 to a position as indicated in dotted lines and by the index letter C or towards the left side of the axis of the friction disc 190, the rotation of the latter will be reversed, resulting in a decrease of frequency of valve openings, due to the valve 42 rotating in the same direction as the turbine. The speed and power of the turbine will thereby be decreased.

While the valve control mechanism, as described above, is connected for controlling a rotating sleeve valve, of which only a fragmentary portion is shown in Fig. 17, it must be understood that any other type of valve, for example such as illustrated in Fig. 15, may be controlled. The slight modifications which are required for such arrangement are illustrated in Fig. 18, which illustrates a combination of some of the elements shown in Figs. 15 and 17 and in fragmentary form. The gear 181 shown in Fig. 17 is replaced by the mitre gear 181a as shown in Fig. 18 and which meshes with the mitre gear 173a carried by the cam shaft 171. The tapered cam 172a operates the valve stem 178 identically as described.

In the turbine, as described, so far the exploded gases expand to atmospheric pressure during passage through the relatively short divergent exhaust nozzle 32. In the following description, and referring particularly to the Figs. 19 to 35 inclusive, I disclose a further modification of my invention and which consists of a two or multiple expansion turbine in conjunction with hollow propeller blades. The modifications, as compared with the previously described embodiments, consist of modified arrangements of the combustion chambers and intake valves. I have, therefore, omitted some of the other elements in the drawings, since their performance and functions are essentially alike, as described, in their cooperation with the modified elements.

In the partly sectional illustrations of the Figs. 19 and 20, the hollow propeller blade 200 is clamped in the two-portioned hub 201 which is fixed to the rotatable and hollow main shaft 202. A valve housing 203 is secured in the cylindrical counterbore 204 of the hub 201 as by the screws 205 and provided with the oppositely located radial orifices 206 which terminate at the counterbores 207. Adjacent to the orifices 206 and in axial alignment therewith are two additional and opposite orifices 208. The propeller blades 200 are provided with counterbores 209 at their inner ends which terminate opposite the orifices 206 of the valve housing 203. Inside of the propeller blade 200, a cylindrical and radial combustion chamber 210 which is carried in the counterbore 209, extends into the counterbore 207 of the valve housing 203 and thereby forms continuation of the orifice 206. The radially extending combustion chamber 210 terminates at its outer and diametrically reduced end with a divergent nozzle 211 and forms an annular space 212 inside the propeller blade 200. Continuation of the space 212 is formed by the coaxial convergent nozzle 213 which extends radially beyond the nozzle 211 and terminates in the divergent shaped and flared portion 214. The nozzle 213 is fixed to the combustion chamber as by the threaded ring portion 215 which is carried by the radial ribs 216 therebetween and the inner end of the nozzle 213.

Beginning at the flared portion 214 of the nozzle 213 and ending in the opening 217 at the propeller tip, a radially extending nozzle 218 is formed by the inner wall portions 219 of the propeller blade 200 and by the curved side walls 220. The side walls 220, which are sealed to the flared end 214 of the nozzle 213 and preferably welded to the inner wall portions 219 of the propeller blade, spread diametrically apart towards the outer end where they join the inner walls of the leading and trailing edges of the propeller. Conforming with the streamlined shape of the propeller blade, the nozzle 218 appears in an outwardly flattened cone shape. The correlation and shapes of the nozzles and combustion chamber are more clearly shown in the full-length sections of the propeller blade as illustrated in the diagrammatic Figs. 26 and 27. The biased or outwardly tapered side walls 220 are for the purpose of gradually increasing the cross-section area in the radial direction of the propeller blade to thereby form the divergent nozzle 218. The extreme end of the latter is bent at a right angle to the radial axis and terminates with the opening 217 which is formed in the propeller tip and points in a tangent direction opposite to the rotation of the turbine. The relatively big opening 217 of the nozzle 218 is preferably made in an elongated form as shown in Fig. 27 to thereby conform with the streamlined shape of the propeller tip. The walls of the propeller blade 200 are provided with vent holes 221 to thereby effect ventilation of the hollow space 222 during rotation.

The inner end of the space 212 is connected by the biased holes 223 which are drilled through the shank of the propeller blade 200, with the space 224 formed inside of the hub 201 and communicating with one of the orifices 208 of the valve housing 203. The space 224 is separated from the diametrically opposite space 224a by the ribs or walls 224b of the hub 201. The spaces 224 and 224a are closed in the front central portion of the hub 201 by the flanged extension 225 of the valve housing 203.

A tubular valve 226 is rotatably fitted in the cylindrical bore of the valve housing 203 and extends rearwards through the hollow shaft 202 and forms the diametrically reduced portion 228 which is supported by the ball bearing 229. The left end of the valve portion 228 extends into the stuffing box 230 of the intake pipe 231. An intake port 232 is provided in the valve 226 to register with either of the orifices 206 and combustion chambers 210. The front end of the valve 226 is closed by the plug 233.

A skirted portion 234, forming the left-hand part of the valve 226, overlaps and surrounds the tubular portion 228 of the latter and seals the orifices 208 of the valve housing 203. The valve 226 is effectively sealed in the valve housing 203 as by the seal rings 235.

In order to more clearly demonstrate the functioning of the valve 226, I have illustrated the latter together with the valve housing 203 exclusively in the Figs. 30 to 34 inclusive. The skirted portion 234 is provided with an air inlet port 232a which is angularly offset in relation to the mixture inlet valve port 232 and adapted to register with either of the two orifices 208 in the valve housing 203. The annular space between the valve extension 228 and the hollow main shaft 202 is in communication with the air supply duct 236 through the connecting head 237 which is sealed to the main shaft and to the valve extension by the stuffing boxes 238 and 239 respectively. The duct 236 may be connected to the atmosphere or to a supply of air under pressure such as a turbocompressor as illustrated in Fig. 1 and may be regulated as by a butterfly valve 240. The fuel for the explosive charges of the combustion chambers 210 is injected through the injector nozzle 52 which is connected by the fuel pipe 54 to a fuel injection pump.

I may, obviously, also connect the intake pipe 231 with a carburetor for supplying the fuel charges for the turbine. Control of the intake valve, the ignition system and the fuel injection pump is effected identically as previously described.

The turbine is started in the same manner as described by rotating the valve 226 in a clockwise direction, thereby admitting an explosive charge to the combustion chamber 210. Immediately after the orifice 206 is closed, the charge is ignited by the spark plug 125 which is screwed in the propeller blade 200 and extends into the combustion chamber 210.

During the process of combustion, the high pressure developed in the combustion chamber will cause the gases to issue at high velocity from the divergent nozzle 211, thereby converting the thermal energy of the charge into kinetic energy, which creates a powerful suction at the entrance to the contracted section 214 of the nozzle 213.

Concurrently with the closure of the orifice 206 by the valve 226 and together with the ignition of the charge, the valve port 232a opens the orifice 208. This position of the valve is illustrated in Figs. 33 and 34, which show cross-sections through the valve and valve housing as indicated by the lines 33—33 and 34—34 respectively in Fig. 32. In Fig. 33, the valve is shown in a relative position to the valve housing 203 and immediately after closure of the orifice 206, at which position the charge is ignited. In Fig. 3A showing a cross-section through the orifice 208 and the skirted portion 234 in the assumed position, the air intake port 232a starts its opening period. Air from the air duct 236 is thereby admitted to the annular space 212 and subsequently drawn through the convergent nozzle 213 and mixed with the gas stream which is ejected from the nozzle 211, thereby increasing the mass of the gases. During the subsequent passage through the divergent nozzle 218, the gases are further expanded while the velocity is reduced with the result that a big mass of air and gas mixture emerges at relatively low speed from the orifice 217 at the propeller tip, thereby effecting a powerful retroactive thrust to rotate the turbine propeller.

It is understood that the duration of opening of the valve port 232a is in correct relation with the discharge period of the gases from the combustion chamber 210. After closure of the air intake port 208, the intake valve port 232 will admit a fresh explosive charge, whereby the described cycle is repeated.

Control of the frequency of explosions is effected by varying the relative speed between the valve and the valve housing, as previously described.

It will be noted that the supplementary air, passing through the space 212 and nozzle 213, effectively cools the combustion chamber and propeller walls to thereby prevent injurious effect thereupon by the high temperature during the combustion periods.

The magnitude of absolute pressure or suction, respectively the injector effect, in the space surrounding the high velocity gas jet during its passage through the constricted portion 214 of the nozzle 213 is, of course, dependent of the characteristics and forms of the divergent and convergent nozzles 211 and 213. I may, therefore, obtain in the space 212 any potentiality of absolute pressure by appropriately designing the nozzles with the result that the air may be supplied to the air duct 236 either under pressure by a blower or directly from the atmosphere.

If the nozzles are designed to effect a powerful injection or suction force in the space 212, I may dispense with the air intake control valve port 232a and orifice 208 and provide constant and direct communication between the space 212 and the atmosphere, as illustrated in the Figs. 28 and 29, wherein the construction of the propeller blades, combustion chambers and nozzles is similar to the previously described embodiment of the invention.

The valve 42 and the valve housing 33 are of equal design and function in the same manner as described relative to the embodiment shown in Fig. 1A of the drawings. The space 242, which is formed in the propeller hub 243 and surrounding the valve housing 33 and the inner ends of the propeller blade shanks, is in open communication with the atmosphere through a central opening 244 at the front end of the hub 243, which is provided with a funnel-shaped part 245. A plurality of radial holes 246 through the wall of the hub are for additional communication with the atmosphere. During rotation of the turbine, a constant stream of air will be drawn through the opening 244 and the two opposite spaces 212 by centrifugal effect. The powerful suction force as caused by the gas blast from the nozzle 211 will, obviously, increase the amount of supplementary air to meet the requirement for a correctly proportioned air-gas mixture in the expansion nozzle 218.

It will be understood, if the gases are allowed to expand still further inside of the propeller blades and before final discharge, the velocity of the exhaust gas blasts will be further reduced. Such expansion of the gases is, however, directly dependent of the length of the divergent discharge nozzle. The expansion is, therefore, limited by the maximum permissible radial length of the propeller blades. I may, therefore, effect further expansion, respectively volumetric increase of the gases, within the limited space of the hollow propeller blade by providing a plurality of air injector nozzles in radial succession, as shown in the diagrammatic Fig. 20A, which illustrates a vertical transverse section of a propeller blade. The remaining portions of the turbine are broken away as they are essentially alike as shown in the Figs. 19 and 20.

Upon ignition of the charge in the combustion chamber 210, the high velocity gas blast issuing from the divergent nozzle 211 is mixed with air during passage of the first convergent-divergent injector nozzle 213a. The air, which enters the nozzle 213a through the annular space 212, may be supplied by a compressor and controlled by an intake valve as shown in Figs. 19 and 20, or may be drawn directly from the atmosphere as shown in the Figs. 28 and 29.

The jet of air and gas mixture, after passing the divergent portion 218a of the nozzle 213a, is further mixed with supplementary air during passage through the second convergent-divergent injector nozzle 218b which communicates with the atmosphere by a plurality of elongated holes 223a through the wall of the propeller blade 200a. In the divergent portion of the nozzle 218b, which is formed by the inside of the propeller blade and by the side walls 220a, the gas-air mixture is still further expanded and finally escapes through the tangent discharge opening 217a and effects a powerful reactionary force whereby the propeller is rotated.

In the foregone description of the operation of the turbine, the admissions of the explosive charges to the combustion chambers are controlled by an intermittently opening valve. The working cycle of the turbine is, therefore, similar to the two-cycle internal combustion engine. The energy is converted by intermittent impulses in contrast to turbines of the continuous flow or continuous pressure type with constant fuel admission and combustion.

The efficiency of the intermittent impulse turbine is, obviously, lowered due to the shock effect of the gases escaping from the discharge nozzles at fluctuating speeds and pressures. This deficiency is, however, almost completely eliminated in the turbine propeller by the cushioning effect of the supplementary air injected into the gas blast which issues from the combustion chamber nozzle. The relatively large volume or mass of the resulting mixture in the hollow propeller blades absorb the shock of the sharp and intermittent blasts from the combustion chamber nozzle with the result that the exhaust gases leave the final discharge nozzle at practically uniform speed.

Furthermore, the frequency of intake valve operations, in other words the time intervals between valve operation cycles, can be regulated by the valve controlling mechanism, whereby I may obtain any desired number of charges, from a fraction to a multiple, per revolution of the turbine.

Obviously, at a high frequency rate of explosions, the rapidly succeeding power impulses merge in to a practically continuous smooth flow of power output and nearly constant speed of the exhaust gases.

It will be understood that, in my invention, I may also adjust the valve controls to effect constant combustion and continuous power impulse. For this purpose, the intake valve may be adjusted to an appropriate open position, for example, such as shown in dotted lines in the Fig. 15 of the drawings, and maintained in the assumed position by regulating the speed of the motor 131, or as in the embodiment shown in the Fig. 17, by correctly positioning the friction pulley 191 in relation to the friction disc 190. The supply of fuel is also maintained constant, such as shown in Fig. 15 to thereby insure a constant supply of explosive mixture to the combustion chambers.

Since I may provide any suitable type of intake valve and fuel supply system to charge the combustion chambers, a rotary sleeve valve may be maintained in open position, such as shown for example in the Figs. 19 and 20, by appropriately regulating the speed of the motor 13 to rotate the sleeve valve 232 in unison with the valve housing 203 and the propeller.

Obviously, the injector nozzle 52 would then be supplied with fuel by a constant delivery fuel pump or any other suitable method, or the injector nozzle and the fuel pump may be obviated and replaced by a carburetor connected to the intake in a similar manner as shown in Fig. 15. The sleeve valve 226 would then be provided with an equal number of valve ports 232 as there are combustion chambers in order to thereby supply charges simultaneously to each one of the latters.

Obviously, during the continuous flow setting of the intake valve, the pressure of the charges entering the combustion chambers must be greater than the pressure developed during combustion to thereby prevent backfiring through the valve or intake openings. The passage of the intake port must be correctly proportioned to effect correct diffusion of the charge in the combustion chamber.

From the foregone it will be understood that the turbine propeller may be operated either as an intermittent impulse or as a continuous combustion type turbine. This may be determined by the speed or the condition of flight or by the characteristics of various fuels employed.

The direction of the reactionary thrust from the mass of the exhausting gas blasts leaving the nozzles at the propeller tips is, obviously, opposite to the direction of said gas blasts and in the direction of the axis of the nozzles, whereby the turbine is rotated. Since any force acting in a given direction may be divided into several component forces which act in different directions, I may also apply the retroactive force to act in different directions with different magnitudes. If, for example, the axis of the nozzle is in the direction of the plan of rotation, in other words, at a right angle with the axis of the main shaft, then the full and direct reactionary thrust is absorbed to rotate the propeller. This position of the nozzle is shown in Fig. 36, wherein the arrow Y designates the direction of rotation of the turbine and the arrow Z indicates the direction of flight of the aircraft and of the axis of the turbine.

If I deviate the axis of the nozzle, respectively the direction of the gas blasts from the plan of rotation, and at an angle in a rearward direction relatively to the direction of flight as shown in the Figs. 2A, 4 and 20, the retroactive thrust will be divided into two component forces, one of which acts in the direction of the plane of rotation to rotate the propeller, and the other in a forward direction or in the direction of flight.

The magnitude of each component force can be determined as a function of the helix angle, at which the reactionary force is applied against the resistance of the propeller blade. Since the reactionary force, which acts upon the propeller tip, originates from the mass of the escaping gases in space and according to the rocket principle, a division of such force, as described, will therefore effect thrusts in different directions and with different magnitudes upon the propeller. As the magnitude of each component force is directly dependent of the size of the helix angle at which the nozzle is positioned, I may obtain any desired combination of component forces by varying the helix angle. The helix angle of the nozzles, together with the propeller blades, may be varied during rotation of the turbine, respectively during the flight of the aircraft, by a variable pitch mechanism as described, whereby the combustion chambers may be angularly adjusted around their radial axes.

It must, of course, be assumed that the surface and angular characteristics of the propeller blades, which are formed by the exterior shape of the combustion chambers, are correctly proportioned to absorb the reaction thrust of the gas blasts at a predetermined maximum speed of rotation. This may, however, also be effected by controlling the power of the turbine through properly regulating the mixture and the admission of the explosive charges to the combustion chambers.

At high altitudes, the combustion chambers, respectively the propeller blades, are angularly adjusted to a high pitch angle position as required for the greater speed of the airplane. Concurrently, the helix angle of the escaping gas stream is also increased whereby a change of the component forces is effected. At a helix angle of 45° to the plane of rotation, the two components will be of equal value. At a still greater helix angle position, the forward component force will approach the value of the direct rocket reaction force of the gas stream which then follows the direction of a high pitch screw thread during the flight of the plane. A corresponding position of the nozzle is illustrated in Fig. 35, which is a plan view of the turbine propeller mounted on an airplane 247. The character X indicates the positive pitch angle at which the gases escape from the nozzle and effect the component forces acting in the direction of the arrow Y to rotate the propeller and in the direction of flight as indicated by the arrow Z.

In the last described angular position of the exhaust nozzles, whereby the major part of the reactionary force of the gas blasts is applied to drive the aircraft by direct jet reaction, the remaining small reaction component of the gas jet is utilized only to maintain rotation of the turbine propeller at a proper speed without effecting any additional traction to the aircraft. The propeller, rotating in a rarefied atmosphere, has lost its bite or traction power and rotates frictionless following a helical path corresponding to the speed of the aircraft.

In order to rapidly reduce the speed of the airplane, as for landing purposes, I may adjust the propeller blades in an opposite direction by the variable pitch mechanism and to a position as indicated by the negative helix angle W in Fig. 37. The gas blast will then escape from the nozzles in a forward direction and, together with the effect of the reversed pitch position of the propeller blades, acts as a brake upon the inertia of the aircraft.

In a turbine propeller equipped with a variable pitch mechanism, the angular position of the exhaust nozzle relatively to the pressure face of the propeller blade to which it is in fixed relation, is, of course, predetermined as to be most suitable for the average flight conditions for which the aircraft is intended. Similarly, in a fixed pitch turbine propeller, the direction of the nozzles may preferably be either in the plan of rotation or at a relatively small helix angle for a low altitude aircraft, while the high helix angle positioned nozzles may preferably be adapted to high-altitude ships. Under various conditions, it may, however, be desirable to combine a high helix angle nozzle with a small pitch propeller blade or vice versa as the case may be. The component force which acts in the direction of flight of the aircraft, must, of course, be considered as a separate addition to the power effect of the turbine, although deriving from the same source, and, therefore, contributes substantially to increase the efficiency.

While I have shown and described the turbine propeller as consisting of two opposite combustion chambers, it is obvious that I may use only one combustion chamber and in conjunction with an oppositely located propeller blade. Furthermore, the turbine may comprise three or more combustion chambers which are radially disposed in equal division on the hub to be in perfect correlative balance, or I may dispose combustion chambers and plain propeller blades in alternate succession around a common hub. It is, of course, immaterial, in view of the above mentioned various propeller assemblies, whether the combustion chamber propeller blades be of the single expansion type, as shown in Fig. 1A, or of the multiple expansion type as illustrated in Figs. 19 and 20A.

The turbine propellers, which are illustrated as being of the traction type—in other words, adapted to effect a pull on the main shaft, respectively aircraft—may also be constructed as a pusher type which would then be located at a rearward position of the aircraft with the direction of rotation and the pitch angle characteristics of the propeller blades as the only possible changes involved. The turbine propeller may also be mounted on the aircraft in any other suitable position, for example with the axis of the mainshaft in vertical direction such as in a helicopter, without departing from the scope of the invention.

The advantages of my invention as described and illustrated will be clearly perceived by the great reduction of weight and manufacturing costs for equal power as compared with the conventional reciprocating combustion engine. Due to the absence of reciprocating parts, the turbine propeller will be practically vibrationless and unaffected by the use of highly detonating fuels or explosive charges. The oil consumption will be negligible, as the internal or mechanical frictions are reduced to a minimum. Another characteristic is the small frontal area of the turbine unit when mounted on an aircraft, whereby the parasitic wind resistance is reduced to a negligible minimum.

Although the thermal efficiency of the turbine, in regard to the conversion of the fuel into energy, may be somewhat lower when compared with the highly developed and expensive conventional aircraft engine, the ultimate overall efficiency, in view of the above mentioned advantages and in regard to flight performance, is anticipated to be far superior to any other means of propulsion so far developed.

It is, of course, understood that various structural changes and modifications may be made in the invention hereinbefore described, and which are limited only by the scope of the appended claims.

I claim:

1. In a reaction turbine propeller, a propeller shaft, an air screw propeller having hollow vane blades, combustion chambers in said blades, a supply of explosive charges, a conduit between said supply and said chambers, ignition means for said charges, control means for said ignition means, a nozzle for each of said chambers for effecting a reactionary exhaust blast whereby to rotate said propeller, an intake control valve in said conduit, control means operatively connected with said valve and said ignition control means and including a differential drive, operative connections between said differential drive and said shaft and a motor operatively connected with said valve.

2. In a reaction turbine propeller, a propeller shaft, an air screw propeller having hollow vane blades, combustion chambers in said blades, a supply of explosive charges, a conduit between said supply and said chambers, ignition means for said charges, a nozzle for each of said chambers for effecting a reactionary exhaust blast from said charges whereby to rotate said propeller, an intake control valve in said conduit, operating means for said valve including a motor, a differential drive having two driving members and a driven member, operative connections between one of said driving members and said shaft, operative connections between the other of said driving members and said valve operating means and operative connections between said driven member and said ignition control means whereby to operate the latter in synchronism with the operation of said valve.

3. In a reaction turbine propeller having a rotatable main shaft, the combination with an air screw propeller blade on said shaft of a combustion chamber in said blade, a supply of explosive charges, a conduit between said supply and said chamber, a reactionary exhaust nozzle connected with said chamber, ignition means for said charges, control means for said ignition means, an intake control valve in said conduit, operating means for said valve, a reversible variable speed drive having a driving element and a driven element, operative connections between said driving element and said main shaft, a differential drive having two driving members and a driven member, operative connection between one of said driving members, said valve operating means and said driven element, operative connections between the other of said driving members and said main shaft, operative connection between said driven member and said ignition control means, control means for said driving element whereby to effect variations of the rotation speed of said driven element in opposite directions and means for operating said valve and said ignition control means independently of the rotation of said main shaft.

4. In a reaction turbine propeller having a main shaft, the combination with an air screw propeller blade, a combustion chamber in said blade and connected with a reactionary exhaust nozzle, a supply of explosive charges having a connection with said chamber, ignition means for said charges, control means for said ignition means, an intake valve in said connection, actuating means for opening and closing said valve, a differential drive having two driving members and a driven member, operative connections between one of said driving members and said main shaft, operative connections between the other of said driving members and said valve actuating means, a motor operatively connected to said valve actuating means, operative connections between said driven member and said ignition control means for operating the latter in synchronism with the actuations of said valve and control means coacting with said valve actuating means whereby to control the magnitude of opening of said valve.

5. In a reaction turbine propeller, in combination with a hollow screw propeller blade, a radial combustion chamber disposed inside of said blade and provided with a divergent nozzle, a source of energy connected with said chamber, means for creating a blast of gas deriving from said source and issuing from said nozzle, a convergent injector nozzle surrounding said divergent nozzle, a supply of air connected with said convergent nozzle and to be mixed with said gas by the injector effect of said blast and a divergent nozzle for directing the gas and air mixture deriving from said blast whereby to effect rotation of said propeller by the retroactive force of the blast of said mixture.

6. In a reaction turbine propeller, the combination with a hollow screw propeller blade of a combustion chamber having a divergent nozzle inside said blade, a source of energy connected with said chamber, means for creating a blast of gas deriving from said source and issuing from said nozzle, a plurality of injector nozzles disposed successively and in extension of said first-named nozzle, means for supplying air to said injector nozzles and to be mixed with said blast of gas and a divergent exhaust nozzle adapted to direct the jet of air and gas mixture whereby to effect rotation of said propeller blade by the reactionary force of the jet of said mixture.

7. In an aircraft, a reaction turbine propeller having a hollow air screw propeller blade, a radial combustion chamber disposed in said blade, a divergent nozzle on said chamber, a source of energy connected with said chamber, means for effecting a blast of gas deriving from said source and issuing from said nozzle, a convergent nozzle in surrounding relation to said divergent nozzle, a supply of air connected with said convergent nozzle and to be mixed with said gas by the injector effect of said blast, a divergent nozzle extending radially relative to said convergent nozzle and adapted to divert the blast of air and gas mixture in a helical direction for effecting rotation of said propeller by the reactionary force of the exhaust blast of said mixture and whereby to propel said aircraft partly by the direct rocket effect of said exhaust blast.

8. In a reaction propulsion turbine, the combination with an air screw propeller having a hollow vane blade of a radially disposed combustion chamber therein having a divergent nozzle, a convergent nozzle in surrounding relation to said divergent nozzle, a divergent nozzle extending radially from said convergent nozzle and having an exhaust opening pointing in a general direction opposite to the direction of rotation of said propeller blade, ignition means in said combustion chamber, control means for said ignition means, a supply of explosive charges, a valve for controlling the admission of said charges to said chamber, a supply of air under pressure, a valve for controlling the admission of said air to said convergent nozzle, control means for both of said valves and said ignition control means and operative connections between said control means and said propeller.

9. In a reaction propulsion motor in combination with a hollow rotatable shaft having a propeller hub, a plurality of hollow air screw propeller blades, reaction exhaust nozzles disposed at the tip of said blades, ignition means in said blades, control means for said ignition means, a conduit between said hollow shaft and said hollow blades, a valve in said conduit, a fuel injection nozzle for said hollow blades, an air compressor in driving engagement with said shaft, a conduit between said compressor and said shaft, a supply of fuel, a fuel injection pump connected to said supply and to said fuel nozzle and control means for said valve, said fuel pump and said ignition control means including a differential drive, a motor operatively connected to said valve, operative connections between said differential and said shaft, operative connections between said ignition control means, said fuel pump and said differential whereby to operate said ignition control means and said pump in synchronism with the operation of said valve.

10. In a reaction turbine propeller, the combination with a hollow propeller shaft carrying a propeller hub of an air screw propeller having hollow vane blades, combustion chambers disposed inside of said blades, divergent nozzles for said chambers, convergent nozzles coaxial with said divergent nozzles to form injector means therewith, divergent nozzles extending radially from said convergent nozzles and having an opening for directing the exhaust gases in a general direction opposite to the direction of rotation of said propeller, ignition means in said combustion chambers, control means for said ignition means, a valve housing in said hub, inlet ports in said housing communicating with said chambers, air inlet ports in said housing communicating with said convergent nozzles, a rotatable sleeve valve in said housing, an orifice in said valve adapted to register with said combustion chamber communicating ports, an orifice in said valve adapted to register with said air inlet ports, a supply of air, communication means in said hollow shaft between said orifices and said air supply, a fuel injection nozzle adapted to inject fuel into said chambers, a supply of fuel, a fuel pump intermediate said fuel supply and said nozzle, control means for said valves including a differential drive having two driving members and a driven member, operative connections between one of said driving members and said valve, operative connections between the other of said driving members and said propeller shaft, operative connections between said driven member, said pump and said ignition control means and driving means operatively connected for effecting rotation of said valve in either direction.

11. In an aircraft propulsion motor the combination of a hollow screw propeller blade of an exhaust nozzle disposed on said blade, a source of energy, valve means for continuously connecting said source with said hollow blade, control means for said valve means for effecting intermittent connection between said source and said blade and means for creating a blast of gas deriving from said source and issuing from said nozzle whereby to effect rotation of said blade by reactionary force from said gas blast.

12. In an aircraft propulsion motor, the combination with a hollow screw propeller blade of an exhaust nozzle disposed on said blade, a source of energy connected with said hollow blade, control means for creating a continuous blast of gas deriving from said source and issuing from said nozzle whereby to effect rotation of said blade by the reaction from said blast and operating means for said control means whereby to effect intermittent blasts of gas from said source.

13. In an aircraft, the combination with hollow air screw propeller blades of radial combustion chambers inside said blades, a supply of explosive charges, valve means for continuously admitting said charges to said chambers, operating means for said valve means whereby to effect intermittent admissions of said charges, control means for said operating means whereby to control the frequency of said admissions, ignition means for said charges and exhaust nozzles connected to said chambers for directing the exhaust blast of the ignited charges in a helical direction relative to the plan of rotation of said blades to rotate the latter by reactionary force of said blast and whereby to propel said aircraft partly by the action of the rotating propeller and partly by the direct rocket effect of said gas blast.

14. In a reaction turbine propeller, the combination with a shaft having a hub of propeller blades rotatably connected to said hub, radial combustion chambers inside said blades, a supply of explosive charges having connection with said chambers, valve means for controlling the passage area of said connection, valve operating means for effecting intermittent operation of said valve to open and closed position, control means for said operating means for varying the frequency of said intermittent operation, ignition means for said charges, exhaust nozzles disposed on said blades and connected with said chambers and having their axes in a direction opposite to the direction of rotation of said blades to effect rotation of the latter around the axis of said shaft by the reactionary impingement of the gas blast from said charges and a control mechanism operatively connected to said blades for rotating the latter a fractional revolution relative to said hub whereby to directionally adjust the axes of said nozzles.

15. In an internal combustion turbine, the combination with a hollow shaft of a hub on said shaft, a plurality of combustion chambers radially disposed on said hub, air screw propeller blades formed around said chambers, a supply of explosive charges connected with said shaft, valve means in said shaft for controlling the passage area for said charges to said chambers, ignition means in said chambers, valve operating means whereby to intermittently vary said passage area, control means whereby to vary the frequency of operations of said valve operating means, an exhaust nozzle on each of said chambers to direct the exhaust blast of the ignited charges whereby to effect rotation of said propeller blades by the reaction of said blasts, a supply of air under high pressure connected with said chambers and air pressure valve means whereby to control the admission of said air to said chambers for starting rotation of said turbine by the reaction of the blast of said air from said nozzles.

16. In a reaction turbine for aircraft propulsion, the combination with an air screw propeller having hollow vane blades of combustion chambers inside said blades, ignition means in said chambers, a reactionary exhaust nozzle connected with each of said chambers, a supply of explosive charges, a valve for admitting said charges to said chambers, control means for said valve to effect intermittent admissions of said charges and variable speed driving means operatively connected with said control means whereby to control the frequency of said intermittent admissions.

17. In a reaction turbine propeller a hollow shaft having a propeller hub, a plurality of hollow propeller blades, combustion chambers in said blades and having exhaust nozzles, a communication chamber in said hub and interconnecting said chambers, a supply of explosive charges having a connection with said communication chamber, ignition means for said charges, a valve for controlling the passage area of said connection and valve operating mechanism to intermittently open and close said valve and to control the frequency of the intermittent valve operations.

18. In a reaction turbine propeller, in combination with a hollow screw propeller blade, a radial combustion chamber disposed inside said blade and provided with a divergent nozzle, a source of energy, valve means for continuously connecting said source with said chamber, means for creating a blast of gas deriving from said source and issuing from said nozzle, a convergent injector nozzle in surrounding relation to said divergent nozzle, a supply of air connected with said convergent nozzle and to be mixed with said gas by the injector effect of said blast, a divergent exhaust nozzle for directing the gas and air mixture deriving from said blast whereby to effect rotation of said propeller by the retroactive force of the blast of said mixture, operating means for said valve means to effect intermittent connections between said source of energy and said chamber and control means for said operating means whereby to vary the frequency of said intermittent connections.

19. In combination in a reactionary propulsion motor for aircraft, a rotatable shaft, radially extending combustion chambers, screw propeller blades formed by said chambers, a supply of explosive mixture, valve means between said supply and said chambers for controlling the passage area therebetween, ignition means for said charges, an exhaust nozzle on each of said chambers and pointing in a direction whereby to effect rotation of said propeller blades by the jet reaction of the exhaust blast issuing from said nozzles, valve operating means whereby to intermittently open and close said valve and control means for said operating means whereby to vary the frequency of the intermittent valve operations.

20. In a reaction turbine propeller, the combination with a hollow screw propeller blade of a combustion chamber having a divergent nozzle inside said blade, a supply of explosive mixture having a connection with said chamber, valve means for controlling the passage area of said connection, means for creating a blast of gas deriving from said supply and issuing from said divergent nozzle, an injector nozzle successive of said divergent nozzle, a supply of air for said injector nozzle and to be mixed with said blast, an exhaust nozzle for directing the gas and air mixture deriving from said blast whereby to effect rotation of said propeller by the retroactive force from the jet of said mixture, a supply of air under pressure connected with said chamber and air pressure valve means whereby to control the admission of said air to said chamber for starting rotation of said turbine propeller by the retroactive force of the jet of air issuing from said exhaust nozzle.

21. In a reaction turbine substantially as described and having a propeller hub, a hollow propeller blade forming a combustion chamber and carried radially by said hub, a bearing in said hub and surrounding the shank portion of said blade for allowing rotation of the latter relative to said hub, a tubular sleeve of reduced diameter extending radially inside said shank portion and forming an annular space extending radially between said chamber and said hub, seal means at the extremities of said sleeve between said chamber and said space and connections between said space and the atmosphere whereby to effect air cooling of said sleeve, said shank portion and said bearing.

JOHN J. KUNDIG.